United States Patent
Martinez-Serna Villagren et al.

(10) Patent No.: US 6,696,095 B1
(45) Date of Patent: *Feb. 24, 2004

(54) METHOD FOR PREPARING DEHYDRATED STARCH CONTAINING FOOD PRODUCTS

(75) Inventors: Maria Dolores Martinez-Serna Villagren, Mason, OH (US); Joan Carol Wooten, Wyoming, OH (US); Eileen Marie Boyle, Cincinnati, OH (US); Jianjun Li, West Chester, OH (US); Donald Ray Patton, Cincinnati, OH (US); Srinivas Achanta, Cinncinati, OH (US)

(73) Assignee: The Procter & Gamble Co., Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/552,952

(22) Filed: Apr. 20, 2000

Related U.S. Application Data
(60) Provisional application No. 60/131,047, filed on Apr. 26, 1999.

(51) Int. Cl.$^7$ .............................................. A23L 1/2165
(52) U.S. Cl. .................... 426/473; 426/615; 426/637
(58) Field of Search ................. 426/241, 242, 426/243, 465, 473, 615, 637

(56) References Cited

U.S. PATENT DOCUMENTS

| | | |
|---|---|---|
| 2,490,431 A | 12/1949 | Greene et al. |
| 2,759,832 A | 8/1956 | Cording, Jr. et al. |
| 2,780,552 A | 2/1957 | Willard, Jr. et al. |
| 2,787,553 A | 4/1957 | Cording, Jr. et al. |
| 3,067,042 A | 12/1962 | Pader |
| 3,355,304 A | 11/1967 | Barnes et al. |
| 3,407,080 A | 10/1968 | Rainwater et al. |
| 3,495,994 A | 2/1970 | Kwiat et al. |
| 3,501,315 A | 3/1970 | Slakis et al. |
| 3,574,643 A | 4/1971 | Lewis |
| 3,594,187 A | 7/1971 | Liepa |
| 3,597,227 A | 8/1971 | Murray et al. |
| 3,619,211 A | 11/1971 | Chang et al. |
| 3,626,466 A | 12/1971 | Liepa |
| 3,634,105 A | 1/1972 | Beck et al. |
| 3,666,494 A | 5/1972 | Bentz et al. |
| 3,772,039 A | 11/1973 | Guadagni et al. |
| 3,800,050 A | 3/1974 | Popel |
| 3,814,818 A | 6/1974 | Chang et al. .................. 426/65 |
| 3,829,582 A | 8/1974 | Guadagni et al. .............. 426/65 |
| 3,830,949 A | 8/1974 | Shatila ......................... 426/456 |
| 3,857,982 A | 12/1974 | Sevenants .................... 426/271 |
| 3,886,291 A | 5/1975 | Willard ........................ 426/637 |
| 3,917,866 A | 11/1975 | Purves ......................... 426/457 |
| 3,968,260 A | 7/1976 | Shatila et al. ................. 426/96 |
| 3,969,183 A | 7/1976 | Redd |
| 3,987,210 A | 10/1976 | Cremer ........................ 426/550 |
| 3,997,684 A | 12/1976 | Willard ........................ 426/550 |
| 3,998,975 A | 12/1976 | Liepa .......................... 426/550 |

(List continued on next page.)

FOREIGN PATENT DOCUMENTS

| | | |
|---|---|---|
| AU | 486136 | 8/1977 |
| CA | 871648 | 5/1971 |
| EP | 0 418 955 | 9/1990 |
| GB | 608996 | 9/1948 |
| GB | 1067793 | 4/1965 |
| GB | 1194421 | 5/1967 |
| GB | 1239946 | 11/1967 |
| GB | 1306384 | 5/1969 |
| RO | 2077210 | * 4/1999 |
| RU | 2006767 C1 | 1/1994 |
| RU | 2077210 C1 | 4/1997 |
| SU | 1836609 A3 | 8/1993 |
| WO | 91/15964 | 10/1991 |
| WO | 93/00823 | 1/1993 |
| WO | 94/23591 | 10/1994 |
| WO | 95/05090 | 2/1995 |
| WO | 96/01572 | 1/1996 |
| WO | 97/25880 | 7/1997 |
| WO | 98/00036 | 1/1998 |
| WO | 98/00037 | 1/1998 |
| WO | 99/03362 | 1/1999 |
| WO | 99/20112 | 4/1999 |
| WO | 99/33357 | 7/1999 |
| WO | 00/54609 | 9/2000 |

OTHER PUBLICATIONS

Miyamoto Toshiyuki, *Patent Abstracts of Japan, Production of Dried Fish–Paste Product*, Publication No. 60232079–Nov. 1985, 1 page.

A.H. Barrett and M. Peleg, *Extrudate Cell Structure–Texture Relationships*, vol. 57, No. 5, 1992–Journal of Food Science—pp. 1253–1257.

Ora Smith, Ph.D., *Potatoes: Production, Storing, Processing*, 1979–Second Edition, The AVI Publishing Company, Inc., pp. 703–705.

William Talburt, M.S. and Ora Smith, Ph.D., *Potato Processing*, 1975–Third Edition, The AVI Publishing Company, Inc., pp. 467–495.

R.T. Whittenberger, *Changes in Specific Gravity, Starch Content, and Sloughing of Potatoes During Storage*, vol. 28, 1951, The American Potato Journal, pags. 738–747.

Catherine J. Personius and Paul F. Sharp, *Adhesion of Potato–Tuber Cells Cells as Influenced by Temperature*, Jan. 26, 1938, The American Potato Journal, pp. 513–524.

Kozempel, M.F., et al.,—Effect of Potato Composition on Drum Dryer Capacity; Lebensm–Wiss. U. Technol. vol. 23 (1990) No. 4, pp. 312–316.

Sandu, Constantine—Infrared Radiative Drying in Food Engineering: A Process Analysis; Biotechnology Progress (vol. 2, No. 3), Sep., 1986, pp. 109–119.

Primary Examiner—Arthur L. Corbin
(74) Attorney, Agent, or Firm—Melody A. Jones

(57) ABSTRACT

A method for preparing dehydrated fruits, vegetables and tubers, particularly potato products. The steps of the method include: boiling the whole raw edible product or slices or pieces of the raw edible product for a time sufficient to partially cook the starch and soften the tissue of the edible product; comminuting the cooked product; and drying the comminuted product.

2 Claims, 15 Drawing Sheets

U.S. PATENT DOCUMENTS

| | | |
|---|---|---|
| 4,073,952 A | 2/1978 | Standing et al. ............. 426/242 |
| 4,107,345 A | 8/1978 | MacDonald et al. ........ 426/637 |
| 4,110,478 A | 8/1978 | Ooraikul ..................... 426/262 |
| 4,156,032 A | 5/1979 | Kluge et al. ................ 426/637 |
| 4,198,437 A | 4/1980 | Citti et al. .................. 426/104 |
| 4,219,575 A | 8/1980 | Saunders et al. ........... 426/242 |
| 4,241,094 A | 12/1980 | O'Neil et al. ................ 426/324 |
| 4,263,332 A | 4/1981 | Withycombe et al. ...... 426/535 |
| 4,361,593 A | 11/1982 | Brooks et al. .............. 426/627 |
| 4,419,375 A | 12/1983 | Willard et al. .............. 426/272 |
| RE31,982 E | 9/1985 | Beck et al. .................. 426/550 |
| RE31,983 E | 9/1985 | Beck et al. .................. 426/550 |
| 4,560,569 A | 12/1985 | Ivers ........................... 426/549 |
| 4,623,548 A | 11/1986 | Willard ....................... 426/559 |
| 4,623,550 A | 11/1986 | Willard ....................... 426/559 |
| 4,645,679 A | 2/1987 | Lee, III et al. |
| 4,668,519 A | 5/1987 | Dartey et al. ............... 426/548 |
| 4,678,672 A | 7/1987 | Dartey et al. ................. 426/19 |
| 4,698,230 A | 10/1987 | Willard ....................... 426/533 |
| 4,769,253 A | 9/1988 | Willard ....................... 426/559 |
| 4,770,891 A | 9/1988 | Willard ....................... 426/559 |
| 4,770,893 A | 9/1988 | Kluge et al. ................ 426/637 |
| 4,781,937 A | 11/1988 | Knowles et al. ............ 426/457 |
| 4,834,996 A | 5/1989 | Fazzolare et al. ........... 426/302 |
| 4,873,093 A | 10/1989 | Fazzolare et al. ............. 426/28 |
| 4,876,102 A | 10/1989 | Feeney et al. .............. 426/550 |
| 4,931,303 A | 6/1990 | Holm et al. ................ 426/549 |
| 4,946,704 A | 8/1990 | De Wit ....................... 426/637 |
| 4,970,084 A | 11/1990 | Pirrotta et al. .............. 426/289 |
| 4,973,481 A | 11/1990 | Hunt et al. .................. 426/144 |
| 4,994,295 A | 2/1991 | Holm et al. ................ 426/549 |
| 5,085,884 A | 2/1992 | Young et al. ................ 426/611 |
| 5,093,146 A | 3/1992 | Calandro et al. ........... 426/619 |
| 5,104,673 A | 4/1992 | Fazzolare et al. ........... 426/549 |
| 5,110,613 A | 5/1992 | Brown et al. ............... 426/549 |
| 5,171,600 A | 12/1992 | Young et al. ................ 426/550 |
| 5,188,859 A | 2/1993 | Lodge et al. ............... 426/560 |
| 5,292,542 A | 3/1994 | Beck et al. .................. 426/285 |
| 5,320,858 A | 6/1994 | Fazzolare et al. ........... 426/549 |
| 5,340,598 A | 8/1994 | Hay, Jr. et al. ............. 426/496 |
| 5,366,749 A | 11/1994 | Frazee et al. ................ 426/549 |
| 5,405,625 A | 4/1995 | Biggs .......................... 426/93 |
| 5,426,248 A | 6/1995 | Sarama et al. .............. 568/824 |
| 5,429,834 A | 7/1995 | Addesso et al. ............ 426/549 |
| 5,433,961 A | 7/1995 | Lanner et al. ................ 426/93 |
| 5,458,910 A | 10/1995 | Gruetzmacher et al. .... 426/611 |
| 5,464,642 A | 11/1995 | Villagran et al. ........... 426/439 |
| 5,464,643 A | 11/1995 | Lodge ........................ 426/439 |
| 5,500,240 A | 3/1996 | Addesso et al. ............ 426/560 |
| 5,514,387 A | 5/1996 | Zimmerman et al. ......... 426/74 |
| 5,514,404 A | 5/1996 | Zimmerman et al. ....... 426/549 |
| 5,554,405 A | 9/1996 | Fazzolare et al. ........... 426/560 |
| 5,624,697 A | 4/1997 | Lin et al. ..................... 426/241 |
| 5,690,982 A | 11/1997 | Fazzolare et al. ........... 426/550 |
| 5,695,804 A | 12/1997 | Hnat et al. .................. 426/550 |
| 5,747,092 A | 5/1998 | Carey et al. ................ 426/560 |
| 5,922,386 A | 7/1999 | Reed et al. .................. 426/549 |
| 5,925,396 A | 7/1999 | Reed et al. .................. 426/549 |
| 5,928,700 A | 7/1999 | Zimmerman et al. ....... 426/549 |
| 6,066,353 A | 5/2000 | Martines-Serna Villagran et al. ........... 426/637 |
| 6,177,116 B1 | 1/2001 | Villagran et al. ........... 426/550 |

* cited by examiner

Fig. 3C

*IR Panel Setup and Power Distribution*

Mash Pan

| A1 240V 1.80 kW | A2 480V 9.00 kW | A3 480V 9.00 kW | A4 480V 9.00 kW |
|---|---|---|---|

| B1 480V 9.00 kW | B2 480V 9.00 kW | B3 480V 9.00 kW | B4 240V 1.80 kW |
|---|---|---|---|

| C1 240V 1.44 kW | C2 480V 7.20 kW | C3 480V 7.20 kW | C4 480V 7.20 kW |
|---|---|---|---|

| D1 480V 7.20 kW | D2 480V 7.20 kW | D3 480V 7.20 kW | D4 240V 1.44 kW |
|---|---|---|---|

| E1 240V 1.44 kW | E2 480V 7.20 kW | E3 480V 7.20 kW | E4 480V 7.20 kW |
|---|---|---|---|

Fig. 12B

METHOD FOR PREPARING DEHYDRATED STARCH CONTAINING FOOD PRODUCTS

CROSS REFERENCE TO RELATED APPLICATION

This application claims the benefit of priority to U.S. Provisional Application Ser. No. 60/131,047, filed Apr. 26, 1999, which is herein incorporated by reference.

TECHNICAL FIELD

The present invention relates to a method for processing fruits, grains, vegetables, and tubers, in particular potatoes, to produce dehydrated products.

BACKGROUND OF THE INVENTION

Farinaceous products comprising dehydrated fruits, grains and vegetables, in particular potatoes, have become extremely popular. Among the most popular products are fabricated potato chips, tortilla chips, pretzels and extruded or puffed products. Farinaceous products are generally made by adding ingredients such as, water, flavoring, emulsifiers and other starch materials to a dehydrated product. The mixture is then typically extruded and/or sheeted and cooked (e.g., baking, frying) to form the final product. Control over the taste and other organoleptic properties of the finished product is largely dependent on the physicochemical and organoleptical properties of the starting dehydrated product.

Among the most popular dehydrated products included in the preparation of farinaceous products are dehydrated potato flakes, flanules, and granules. Two basic processes are employed to produce dehydrated granules, flanules and dehydrated potato flakes. The initial preparation for both processes is typically the same. Raw potatoes are washed, peeled, and inspected to remove any defective potatoes. The good potatoes are cut into slabs, rinsed with room temperature water, and fed into the cooking operation, which is divided into two cooking steps. The first cooking step is a pre-cook step which partially cooks the potato at about 155° F. to about 175° F. (the activation temperature at which hydrolysis of protopectin can occur) and solubilizes some of the starch. During this step, swelling and gelatinization of the starch starts to occur. Following the pre-cook, the potatoes are cooled in water which causes the solubilized starch to precipitate out of solution, also known as retrogradation. In the case of flanules, and in the case of some types of flakes (i.e. some flakes used to produce fabricated snacks), the precooking and cooling steps are omitted. The second cooking step involves cooking the potatoes in a steam cooker that gelatinizes the starch and prepares the potatoes for dehydration. After this point in the process, the granule and flanule process differ from the flakes process. The granules and flanules process differs from the flake process in that the drying step is gentler and does not destroy potato tissue as does the drum drying that is more commonly used in the flaking process. Drum drying relies primarily on conduction heat transfer, which can be inefficient and detrimental to product quality. In the case of flanules, the drying operation includes fluidization and air lift drying, which are both based on convection heating.

Secondly, the dehydration step is much slower, causing retention of potato granules in the system for long periods. Thirdly, the granulation procedure differs from the flaking process in the drying procedure employed, whereby a portion of the granules, which are first dried, are recycled back into the stream of cooked mashed potatoes. This procedure is known as the add-back process.

Conventional methods for processing potatoes into dehydrated products have certain disadvantages. In the conventional processes for making potato flakes and granules, the potatoes are subjected to pre-cooking, cooling, cooking, and a number of other steps that reduce and change the original potato flavor and starch functional properties. Typically, the potatoes are washed, peeled, blanched, precooked and cooled before the cooking step. The potato slices are generally transported by water. This requires a substantial use of water and energy. The steps of water pre-cooking and cooling result in substantial loss of water soluble flavor precursors (or flavor components) and various aqueous phase reactions that degrade the taste and quality of the dehydrated product. Additionally, a considerable loss of the positive volatile flavor components can occur during drying. From an economic standpoint, these processes require a considerable expenditure of energy, time, and money in the pre-cooking, cooling, cooking, and drying steps. In addition to loss of flavor, from up to about 10% of the potato product can be lost during peeling. During the step of peeling of potatoes, high steam pressure is used to soften the skin from the potato tissue. This forms the so called "peel ring", which is a thin layer of cooked starch surrounding the potato. Later during cooking this thin layer represents swollen starch which delays the heat transfer rate to the center of the potato pieces, causing uneven cooking of potatoes, resulting in a combination of raw potato pieces and overcooked potato pieces.

Another disadvantage of conventional processes for dehydrating potatoes arises because of the relatively long cooking time (up to about 45 minutes) needed to thoroughly cook the raw potato. The consequence of slow cooking is also the substantial use of energy needed to cook the raw product. Such prolonged cooking time of the potato destroys vitamins, reduces initial concentration of desirable flavor precursors, contributes to the formation of processed flavors, and increases cell damage.

A further disadvantage of conventional processes is that they can not be used efficiently to produce consistent quantities of high quality potato flakes, flanules, and granules suitable for use in farinaceous products. Additionally, in most cases the primary processes are not designed to produce flakes or granules having the characteristics suited, to say extrude or form a sheetable dough, but rather aimed at producing an ingredient for a completely different use such as rehydration for table use (e.g., mashed potatoes), or low shear forming potatoes for intermediate moisture products, such as, potato pancakes or French fries.

Accordingly, it is an object of the present invention to provide an efficient method for dehydrating fruits, vegetables, and grains, in particular potatoes, based on energy consumption and potato losses.

Another object of the present invention is to provide a process for making dehydrated potato products which enhances cooking to obtain key material transformations, while resulting in significantly shorter cooking residence times, and improved quality.

It is another object of the invention to provide a method for producing high quality, low cost dehydrated potato products using a method that is simple, quick and economical.

Still another object of the present invention is to provide a process for making dehydrated potato products, which eliminates the need for precooking and cooling of the raw potatoes.

It is another object of the present invention to provide dehydrated potato products particularly suitable for use as part of the dough used to make fabricated farinaceous products such as fabricated potato snack pieces.

It is further an object of the present invention to provide dehydrated potato products having improved nutritional value, color and processing quality over conventionally produced flakes, flanules, or granules.

It is further an object of the present invention to provide dehydrated products having an increased level of flavor precursors as compared to conventionally produced products.

It is another object of the present invention to provide dehydrated potato products particularly suitable for use in providing reconstituted mashed potatoes with improved flavor, texture, and shelf life.

These and other objects of the invention will become apparent from the following disclosure and claims.

SUMMARY OF THE INVENTION

In accordance with the present invention, an improved method of producing dehydrated products is provided. While the invention is particularly useful in preparing dehydrated potato products, it is also useful in preparing other dehydrated products such as fruits (e.g., bananas, pears, apples, peaches, apricots) and vegetables (e.g., sweet potatoes, beets, pumpkin), and grains such as corn products (e.g. masa), wheat, oat, barley, sago, amaranth, and cassava.

The present invention is primarily concerned with (1) substantially eliminating the pre-cooking, cooling and optionally peeling steps, (2) substantially reducing the cooking time by a) augmenting functional characteristics typically achieved by extended cooking, for example release of free amylose, by adding exogenous sources such as wheat starch or potato starch, b) and/or basing the minimum cooking time on the energy needed to partially gelatinize the starch, inactivate the enzymes responsible for enzymatic browning, and activate the enzyme responsible for cell separation and partial hydrolysis of the protopectin, resulting in softening of the tissue, c) and varying the size of potato pieces, and (3) reducing the drying time of the raw product by enhancing drum drying with infrared heating. This results in flakes having improved physicochemical properties, flavor, nutritional and appearance (e.g. lighter color) benefits.

According to one embodiment of the present invention, a method for preparing a starch containing product is provided. The method comprises the steps of: providing a starch containing material comprising one or more enzymes capable of causing browning, lipid oxidation, or hydrolysis of cellulosic material; partially cooking the starch containing material for a predetermined amount of time and temperature sufficient to substantially inactivate one or more of the enzymes to reduce enzymatic browning, activate the enzyme responsible for partial hydrolysis of cellulosic material, enable cell separation, at least partially gelatinize the starch, and maintain breakage of starch cells to less than about 70%, preferably to less than about 40%, and more preferably to less than about 20%; comminuting the partially cooked starch containing material to produce a wet mash; and drying the wet mash to produce a dehydrated product having a moisture content below about 15% on a fat free basis.

According to another embodiment of the present invention, another method for preparing a starch containing product is provided. The method comprises the steps of: providing a starch containing material containing sugars of any other components having the ability to produce non-enzymatic browning; partially cooking the starch containing material for a predetermined amount of time and temperature sufficient to at least partially gelatinize the starch and maintain breakage of starch cells to less than about 70%, preferably to less than about 40%, and more preferably to less than about 20%; comminuting the partially cooked starch containing material to produce a wet mash; and drying the wet mash to produce a dehydrated product having a moisture content below about 15% on a fat free basis.

The starch containing material can comprise polyphenol oxidase, and the step of partially cooking the starch containing material can comprise cooking the starch containing product for sufficient time to substantially inactivate the polyphenol oxidase without completely gelatinizing the starch. The starch containing material can also comprise one or more materials capable of causing non-enzymatic browning. The starch containing material can comprise protopectinase, and the step of partially cooking the starch containing material can comprise cooking the starch containing material for sufficient time to substantially activate the protopectinase without completely gelatinizing the starch.

The step of partially cooking the potatoes can comprise cooking for a time sufficient to produce potatoes having a center texture value of from about 20 gf to about 1000 gf, preferably from about 100 gf to about 500 gf.

The product may be cooked by water immersion, steam, a combination of water immersion and steam, or microwave for a time sufficient to: partially gelatinize the starch such that, if desired, complete gelatinization can occur during subsequent process steps (e.g., drying, frying, baking, or extrusion); inactivate the enzyme (e.g., polyphenol oxidase) responsible of browning; and activate the enzyme responsible for cell separation through partial hydrolysis of protopectins (protopectin is an insoluble, highly polymerized form of pectin associated with the cell wall structure) resulting in softening of the tissue. The product can be comminuted, and then dried. The comminuted product may be dried using various drying methods, for example, drum drying, infrared drying, a combination of infrared and drum drying, freeze drying, fluidized bed drying, air-lift drying, or combinations thereof.

The method can further comprise the step of adding an additive or any material including dry flakes to the wet mash prior to the drying step, wherein the additive is effective in altering the rheology of the mash. The additive is effective in altering the viscosity of the mash, and can be effective in supplementing the free amylose and/or amylopectin content of the mash. In one embodiment, the additive can comprise an unmodified starch to the wet mash prior to the drying step and wherein the starch is selected from the group consisting of wheat starch, corn starch, tapioca, rice starch, potato starch, oat starch, sago starch and mixtures thereof.

The method can further comprise the step of adding chemical reagents to produce chemical modification of potato starch in the flakes (i.e. succinylation, acetylation, phosphorilation, etc.). This will result in cross-linked potato starch in the flakes, or substituted, or other modification. The additive could have the objective of altering the pH of the mash (i.e. calcium hydroxide, hydrocholoric acid, citric acid, etc.).

According to another embodiment of the invention, a method is provided for drying a material to form a dehydrated product. The method comprises: (a) providing a wet mash comprising the material to be dried; (b) drying the wet mash wherein drying the wet mash comprises the step of (i) providing a first energy source selected from the group consisting of conductive heat sources, convective heat sources, infrared energy sources, and combinations thereof;

(ii) providing a second energy source comprising a source of infrared energy;
(iii) forming a layer of the wet mash, the mash layer having a first surface and an oppositely facing second surface;
(iv) heating the first surface of the mash layer with the first energy source; and
(v) heating the second surface of the mash layer with the second energy source;

wherein the mash is dried to a moisture content of less than about 50 percent by weight prior to heating the second surface of the mash layer;

and wherein at least a portion of the steps of heating the first and second surfaces of the mash layer are carried out simultaneously.

In one embodiment, the first energy source is a steam heated drum dryer. The first surface of the mash can be disposed on a heated drying surface of the drum dryer and the oppositely facing second surface of the mash is heated by the infrared source.

According to another embodiment of the present invention, dehydrated potato flakes are provided. The dehydrated potato flakes have an. Average Vitamin C Retention Rate of at least about 7% relative to the Vitamin C initially present in the potato material from which the potato flakes are formed; and the flakes have a Relative Absorbence Index of less than about 1.5.

The dehydrated potato flakes can have a color corresponding to a "L" value greater than about 78 Hunter units, a "b" value less than about 21 Hunter units, and an "a" value of from about −1 to about −3 Hunter units. The flakes can comprise up to about 0.3 ppm, preferably from about 0.1 to about 0.3 ppm, of 2-methylpyrazine; and up to about 2.7 ppm, preferably up to about 1.5 ppm, of phenylacethaldehyde; and up to about 0.7 ppm, preferaby from 0.1 to 0.6 ppm, of methional; and have a free amylose content of from about 20 to about 38%.

The flakes can be used to form a dough having a modulus of elasticity (G') of from about 15000 Pascals to about 90000 Pascals, preferably from about 35000 Pascals to about 55000 Pascals; and a viscosity modulus (G") from about 3000 Pascals to about 15000 Pascals, preferably from about 5000 Pascals to about 10000 Pascals. In one embodiment of the present invention, the flakes and corresponding dough can be used to make fabricated snack products.

An important advantage of the present invention is a reduction in product losses and an increase in production rate over conventional processes. Another advantage of the present invention is elimination of the pre-cooking, cooling, and preferably the peeling step, thereby significantly reducing cooking time and residence time during drying. This reduces cost and removes expenses associated with high energy and high water usage hereto for encountered by the processing industry. Reduction of cooking time in combination with no peeling of potatoes increases production rate in the flaking process. This is due to the fact that potato peeling is still attached to the potato tissue when it is partially cooked, and no peel ring has been formed. This causes the peel to stick more to the drum drier and to the mashed potatoes, and increases the production in terms of lbs/hr. In the current flaking industry, when unpeeled overcooked potatoes are processed, the peel normally separates from the mash during drum drying through the last applicator roll, causing an increase in potato losses.

Still another advantage of the present invention is that the dehydrated product has less formation of degradation products and retains more nutrients (such as Vitamin C), more flavor precursors, and more total amino acids than a corresponding product obtained by conventional methods. A further advantage of the present invention is that it provides a product having improved color retention, less processed flavor and less cell breakage. Without being limited by theory, it is believed that this is due to a) inactivation of polyphenol oxidase and b) reduction of the non-enzymatic browning reaction rate and the residence time of the mash during cooking and drying. The term non-enzymatic browning reaction refers to the reaction wherein a reducing sugar containing material, when heated alone or in the presence of amino acids, peptides, and proteins, can result in the production of dark brown melanoidins and other compounds, some of which impart undesirable flavor.

Reduction of cell breakage is due to shorter residence time during cooking and drying. Less cell damage results in a decrease of compounds leaching from the cell (e.g. flavor precursors and nutrients such as vitamins).

DESCRIPTION OF THE DRAWINGS

FIG. 3C. Schematic illustration showing the ar rang ement of infrared heating panels around the circumference of the drum in FIG. 3B, the panels being arranged in 5 rows, each row containing 4 panels.

FIG. 4A) Example of <50% broken cells, FIG. 4B) Example of ~50% broken cells, FIG. 4C) Example of >50% broken cells.

FIG. 12B. Illustration of IR panel setup and power distribution. Shows the distribution of IR panels and power as it is set up in the lowest point of the drum drier.

DESCRIPTION OF THE TABLES

Figure 1:
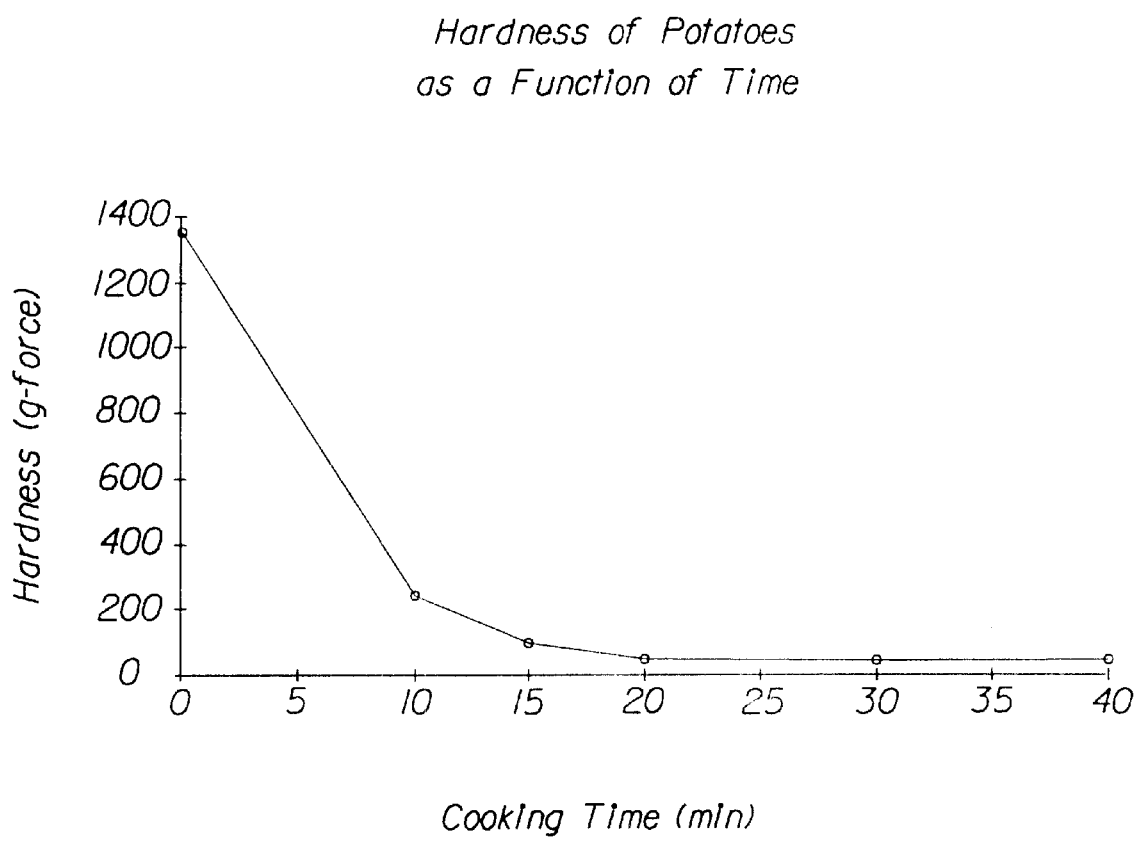
FIG. 1. Graphical illustration of the hardness of raw potatoes and potato slices cooked for various cooking times.

Table 1. Table 1 illustrates the difference in functionality between potato and wheat starches.

Table 2. Table 2 illustrates the Total Pore Area of Potato Flakes for the present invention versus conventional flakes.

Table 3. Table 3 illustrates the Hunter Colorimeter values for "a", "b", and "L" for potato flakes of the present invention.

Table 4. Table 4 illustrates Vitamin C retention (%) of potato flakes made with different processes.

Table 5. Table 4 illustrates the Total amino acid composition for conventional potato flakes and potato flakes made according to the present invention.

Table 6. Table 6 illustrates the comparison of relative levels of selected volatile flavor compounds in the dehydrated potato products (relative reduction to conventional processed products, calculated as the ratio of the peak areas of the flavor compound for the selected ion in the conventional product to the products of the invention; this is the "Reduction Ratio").

Table 7. Table 7 illustrates quantitative analytical results comparing heat generated volatile compound content of conventional flakes and flakes made according to the present invention.

DETAILED DESCRIPTION

As used herein, "co-flaking" refers to the addition of an additional ingredient or chemical into the mashed potato prior to drying.

As used herein, "co-flaking agent" refers to a material or a mixture of materials that is added into the mash operation, prior to drying, to modify the functionality of the mash.

As used herein, "reduced cooking" referes to the degree of cooking required to only partially gelatinize starch and to inactivate enzymes responsible for browning.

As used herein, the term "fabricated farinaceous products" refers to food products made from doughs that contain flour, meal or starch derived from tubers and/or grains.

As used herein "cohesive dough" is a dough capable of being placed on a smooth surface and rolled or extruded to the desired final thickness or extruded through a die orifice without tearing or forming holes. As used herein, "mashed potatoes" include those potato products made by mixing dehydrated potatoes with water.

As used herein, "dehydrated potato products" includes, but is not limited to, potato flakes, potato flanules, potato granules, potato agglomerates, any other dehydrated potato material, and mixtures thereof.

As used herein "flanules" refers to dehydrated potato products described in U.S. patent application Ser. No. 09/175,138, Dough Compositions Made With Dehydrated Potato Flanules, filed Oct. 19, 1998 in the names of Villagran et al., which patent application is incorporated herein by reference. Flanules are dehydrated potato products with a functionality between flakes and granules (as defined by a WAI of from about 5.5 to about 7 and % free amylose of from about 9 to about 19 for flanules).

As used herein "Reduction Ratio" is defined as the ratio of the peak areas of the flavor compound for the selected ion in the conventional product to the products of the invention, as described in the "Heat Generated Volatiles" section herein and in the "Simultaneous Distillation, Extraction, and GC Analysis for Volatile Compounds" analytical method herein.

As used herein "rapid viscosimeter units (RVU)" is a unit of viscosity related to centiPoise by: 12 RVU equals approximately 1 centiPoise.

As used herein, "cellulosic material" refers to nonstarch polysaccharides, which for potatoes are distinguish among the following: a) crude fiber, b) cellulose, c) pectic substances, d) hemicellulose, e) other polysaccharides. Crude fiber is a generic term referring to the dry matter of the potato after removal of all the solubles and most of the starch and nitrogeneous constituents. Cellulose is present in the supporting membrane of the cell wall and is about 10–20% of the nonstarch polysaccharide of the potato. Pectic substances of plants are divided into three categories: 1) protopectin, 2) soluble pectin, and 3) pectic acid. Protopectin is an insoluble, highly polymerized form of pectin associated with the cell wall structure. Protopectin constitutes 69–77% of the total pectic susbtances of the potato. There is a low level of soluble pectin in freshly harvested potatoes (Kroner and Volksen, 1950). Hemicelluloses are cell wall components (~1%) made of mixed glycosidic chains containing combinations of glucuronic acid with xylose, and of galacturonic acid with arabinose.

As used herein "total amino acid content" refers to extractable, free amino acids as well as those amino acids in the form of proteins or amino acids that are attached to, or bound to, other molecules. "Free amino acid content" refers to those amino acids that are readily extractable and not attached to, or bound to, other molecules.

All percentages are by weight unless otherwise specified.

The method of the present invention will be described emphasizing the preparation of dehydrated potato flakes and granules. This is by way of illustration and not limitation. In its broadest aspect, the method of the present invention is generally applicable to the preparation of dehydrated fruits (e.g., peaches, apples, apricots, pears, bananas), vegetables (e.g., potatoes, sweet potatoes, beets, spinach, onion, carrots, celery, tomatoes, zucchini, broccoli, mushrooms, peas), grains (e.g., barley, oats, corn, rye, wheat, rice, amaranthi, sago), flaked seasoning and spices/herbs (e.g., garlic, chives, parsley, coriander, pimento, ginger, green pepper, red pepper, black pepper), flaked fish, dehydrated milk, and the like. The present invention is also applicable to produce flakes that can be used in baby foods.

The method of the present invention can also be applied for other starch containing materials such as glues, and pharmaceutical materials.

Any commercially available potatoes used to prepare conventional potato flakes, flanules, and granules can be used to prepare the dehydrated potato products of the present invention. Preferably, the dehydrated products are prepared from potatoes such as, but not limited to, Norchip, Norgold, Russet Burbank, Lady Russeta, Norkota, Sebago, Bentgie, Aurora, Saturna, Kinnebec, Idaho Russet, and Mentor.

In one embodiment of the present invention raw whole potatoes are first washed. The potatoes may also be sliced into pieces of any size. If reduced in size, the potato pieces can be cut into slices having a thickness of about 0.125 inches to about 0.75 inches. For instance, the pieces can be cut into ¼" by ¼" French Fries, or ⅛" by ⅛" shoe-string potato pieces. The potatoes slices or pieces may be peeled, partially peeled or not peeled. Preferably the potatoes are partially peeled or completely unpeeled. The potatoes are washed and optionally sliced and then subjected to a cooking step. The potatoes may be cooked by submersion in water, steam at atmospheric, sub-atmospheric pressure, or above atmospheric pressure or a combination. The potato pieces are cooked with steam or submerged in water for a time sufficient to partially gelatinize the starch, reduce enzymatic and non-enzymatic browning, and soften the potatoes to the point where they can be mashed.

By way of example, potato slices having an average thickness of about ⅜ inch to about ½ inch can be cooked by the reduced cooking method of the present invention from about 12 to about 25 minutes, more particularly from about 14 to about 18 minutes, with steam having a temperature of about 200° F. to about 250° F. Shoestring cut potatoes pieces can be cooked by the reduced cooking method of the present invention for about 7 to about 15 minutes, more particularly from about 9 to about 12 minutes with steam having a temperature of about 200° F. to about 250° F.

In another embodiment of the present invention raw, whole potatoes, potato pieces or potato slices are cooked using microwave heating. When sliced, care must be taken in selecting the piece thickness when using microwave cooking to avoid localized heating due to internal standing wave patterns (i.e., interference patterns). The potatoes may be unpeeled, partially peeled or totally peeled. Preferably the potatoes are whole and unpeeled. When using microwave cooking potato slices having an average thickness of about ⅜ inch to about ½ inch typically require from about 6 to about 20 minutes, more particularly from about 8 to about 17 minutes cooking with microwave energy having a wavelength of about 900 to about 2500 Mega Hertz (MHz). Whole potatoes generally require cooking from about 6 to about 30 minutes, more particularly from about 12 to about 20 minutes with microwave energy having a frequency of about 900 to about 2500 MHz. The potatoes can be punctured with needles over the surface of the potato prior to cooking. Cooking time will very depending on the field strength, loading, and frequency.

In a preferred embodiment of the present invention the whole potato is used. The potato may be unpeeled or partially peeled. Preferably the potato is unpeeled. When partially peeled or unpeeled whole potatoes are used, the peel acts as a protective layer that allows the starch to cook while minimizing disruption of the potato tissue. This results in a reduction of potato cell breakage, and a reduction in potato losses (including water soluble compounds) in the subsequent unit operations. It is advantageous to use whole unpeeled or partially peeled potatoes to avoid overheating the starch located in the outer surface. Such overheating of the starch can result in starch swelling, which can expand and seal the surface thereby reducing the heat transfer rate to the center of the potato. The whole potatoes may be cooked with water, steam at atmospheric or sub-atmospheric pressure or a combination of both, or with an air convection oven.

Preferably, the potatoes are cooked by water immersion at the proper temperature for a time sufficient to partially gelatinize the starch, inactivate the enzymes and soften the potatoes to the point where they can be mashed. In hot water having a temperature of about 176° F. (80° C.) to about 212° F. (100° C.), preferably 185° F. (85° C.) to about 212° F. (100° C.), and more preferably 188.6° F. (87° C.) to about 212° F. (100° C.), this can be accomplished with whole potatoes having an average size of about 3 to about 6 inches in about 15 to about 40 minutes, preferably in about 20 to about 35 minutes. In one embodiment, the potatoes can be from about 2 to about 7 inches in size (distance of longest side of potatoes) and can be cooked about 25 minutes.

The actual temperature and length of time the potatoes or potato pieces are cooked is dependent upon the size of potatoes that are being cooked and the method used to cook (i.e., steam pressure, boiling temperature) the potatoes. In the conventional process, the potatoes are cooked until the hardness of the center of the potatoes drops from about 1000 gf to about 40 gf. Normally, during cooking of the potatoes, the tissue becomes softer as the protopectinase hydrolyzes the protopectin of the cell walls of the potato.

According to the present invention, potatoes are only cooked for a predetermined amount of time ("Reduced Cooking"). This predetermined amount of time is no greater than necessarily to achieve partial or complete starch gelatinization and enzyme inactivation, while maintaining the hardness of the potatoes at significantly higher (about 90 to 200 gf) levels compared to the conventional process. The cooking time is determined by measuring the hardness of the potatoes at the center with a Texture Analyzer (TA, Instruments, Corp., New Castle, Del.). A measurement in the range of about 90 to about 200 grams force, preferably from about 120 to about 180 grams force, more preferably from about 130 to about 150 grams force indicate that the potatoes are cooked sufficiently for purposes of the present invention. FIG. 1 shows the graph obtained for raw potatoes and slices cooked for various cooking times.

Next, the cooked potatoes are comminuted to produce a wet mash. Comminuting of the cooked product may be accomplished for example, by ricing, mashing, shredding or a combination of mashing and shredding. Comminution of the cooked potatoes is preferably performed by shredding the potatoes using a conventional potato shredder such as Lan Elec Shredder, Model #PC14AHD, mashing the potato, shredding followed by mashing or by using a common ricer, or modified ricer plate that has slits rather than orifices. These slits may also have additional sharp edges to enhance cutting of whole potatoes.

Various ingredients can be added to the mash (herein after refer to co-flaking agents) with specific purposes, such as but not limited to the following:

1) to modify (i.e. increase) free amylose, native starches, modified starches, and resistant starches can be added to the mash;

2) to modify (i.e. increase) amylopectin, modified starches, waxy rice, pea starch and waxy corn can be added to the mash;

3) to change or modify mash viscosity, hydrolyzed starches such as maltodextrins or corn syrup solids, as well as all the above starches, can be added to the mash;

4) to change the elasticity of the mash, gums, proteins, fibers, or chemicals (i.e. succinic acid, acetylated acid, phosphoric acid, hydroxypropilation, etc.) can be added to the mash;

5) to modify the Water Absorption Index, modified starches and/or gums, as well as chemicals to carry out potato starch chemical modifications, can be added to the mash;

6) to alter cell wall strength of potato cells in the mash, calcium carbonate, calcium chloride, calcium hydroxide, or other sources of calcium can be added to the mash;

7) to enhance positive flavor reaction, flavor precursors such a amino acids (e.g. methionine), flavor encapsulating agents such as cyclodextrins, sweeteners, dairy products (such as nonfat dry milk, whey products, and buttermilk), spices, and color can be added to the mash;

8) to decrease cell wall strength in the mash, calcium chelating agents such as citric acid, sodium citrate, and other cation chelators can be added to the mash;

9) to alter the pH of the mash to reduce non-enzymatic browning, acidic compounds (such as, but not limited to, ascorbic acid, fumaric acid, phosphoric acid, or mixtures thereof) can be added to the mash.

In addition, co-flaking agents which alter aging of the starch containing product can also be added.

Starch may be added to the mash ("Co-flaking") in order to impart unique characteristics to the dehydrated potato flakes. As used herein "starch" refers to a native or an unmodified carbohydrate polymer having repeating anhydroglucose units derived from materials such as wheat, corn, tapioca, sago, rice, potato, oat, barley, ameranth, modified starches including but not limited to hydrolyzed starches such as maltodextrins, high amylose corn maize, high amylopectin corn maize, pure amylose, chemically substituted starches, crosslinked starches, and mixtures thereof. "Starch" can also include dried potato flakes added back into the mash.

The preferred starch is an uncooked starch having a smaller starch granule size, having a water absorption index (WAI) less than that of the potato starch, such that the starch swells to a lesser degree than the potato starch during cooking, and having a percent of free amylose greater than that of the potato starch at the same cooking level. The benefits of starch addition ("Coflaking") include: 1) increased productivity rate by increasing the surface porosity of the mash, as well as solids content of the mash, thereby reducing the residence time for drying to achieve a desired moisture content of the flakes, and 2) increased free amylose content of the resulting flakes (in the case of addition of wheat starch), which is important factor when forming dough pieces for snacks manufacturing (i.e. provide cohesiveness to the dough).

The starch addition serves several functions. The addition of starch increases the cohesiveness of the freshly mashed potatoes, improves water distribution in the mash, and improves the adhesiveness of the mash to the drum. Without being limited by theory, it is also believed that wheat starch indirectly prevents rupture of the potato cells by providing additional free amylose to the mash over and above that provided by the potato starch cooked under similar conditions. In particular, the wheat starch provides free amylose that would otherwise have to be provided by prolonged cooking of the potato starch. Accordingly, the addition of wheat starch allows partial, or fully cooking of the potatoes, versus uneven cooking of potatoes during the manufacture of potato flakes.

TABLE 1

Shows differences in functionality between potato starch and other starches.

| Starch | Granule size (μm) | Shape | Gelatinization (° C.) | Water Absorption Index (WAI) | Swelling Power |
|---|---|---|---|---|---|
| Potato | 15–100 | oval | 56–66 | 8–12 | >1000 |
| Wheat | 2–35 | flat & eliptic | 52–63 | 3.5 | 21 |
| Rice | 3–8 | polygonal | 61–77.5 | 3 | 19 |
| Corn | 5–25 | polygonal | 62–72 | 4.5 | 24 |

Staining microscopic studies have revealed that in the wheat starch granule the amylose tends to diffuse to the outer part of the starch granule and to the aqueous phase even before gelatinization is fully completed. This is a consequence of its lower swelling capacity. Shearing of the wheat starch pastes leads to a fragmentation of the outer layer of the granules, which results in fragments released from the outer layer of the swollen granule. The changes occurring when the wheat starch pastes are sheared are minor compared to those observed in potato starch pastes, where shearing completely altered the microstructure. The potato starch granule disintegrates readily after gelatinization. It has been suggested in the literature that the disintegration is preceded by the collapse or cavitation of the swollen granule, causing nodes or weak points in the granular walls. Also, it has been suggested in the literature that the difference between wheat starch and potato starch is the amylose distribution in the starch granule. The wheat starch has the amylose located in the outer part of the granule, which enables the amylose to leach out after swelling, while the potato starch has the amylose located relatively closer to the inner portion of the granule.

In the practice of the present invention, starch from about 0.5% to about 50%, preferably from about 2% to about 30%, more preferably from about 4% to about 15% starch is mixed with the wet mash. During mixing, the starch is uniformly distributed in the mash. For native starches derived from rice, wheat, pea, corn or from any tuber or grain source high in amylose (i.e., 30% by weight amylose). For modified starches derived from potato, waxy corn, or any tuber or grain high in amylose content (>50%). The wet mash and starch mixture can then be processed according to the procedures set forth below.

If desired, at least about 0.1% emulsifier can preferably be added to the wet mash or mash/starch composition as a processing aid. Higher levels of up to about 3%, preferably up to about 1%, of an emulsifier can also be added, if needed, to complex the free amylose in case the mash is too sticky (e.g., too many broken cells due to overcooking). The preferred emulsifier is a distilled monoglyceride and diglyceride of partially-hydrogenated soybean oil. Other emulsifiers suitable as processing aids in making potato flakes known in the art, e.g. lactylate esters, sorbitan esters, polyglycerol esters, lecithins, can also be used. The emulsifier works via several mechanisms. The first is as a coating of the free starch from the cells controlling stickiness and adhesiveness of the mash on the drier, and the second is to provide lubrication in the system to control cell damage due to excessive shear.

Additionally other optional ingredients can be added to the wet mash/mash composition to improve the storage stability of the dehydrated potato flakes and granules. Various stabilizers and preservatives are usually employed to improve the stability and texture of the resulting flakes or granules. For example, sulfite may be added to the wet mash to produce a dehydrated product comprising from about 150 to about 200 parts per million (ppm) of sulfite. The sulfite, if used, is added to the wet mash as dry sodium sulfite and sodium bisulfite and protects the flakes and granules from darkening during processing and subsequent storage. Antioxidants such as propyl gallate, BHA (2 and 3-tert-butyl-4-hydroxy-anisole), BHT (3,5-di-tert-butyl-4-hydroxytoluene), and natural antioxidants such as rosemary, thyme, marjoram, and sage, can be added in an amount up to a total of about 10 ppm to prevent oxidative deterioration. Citric acid can be added in a quantity sufficient to give about 200 ppm in the dried product to prevent discoloration caused by the presence of iron ions. Ascorbic acid can also be added to compensate for the Vitamin C losses during processing.

The next step of processing is the drying or dehydration step which is used to form the dehydrated flakes or granules. Conventional equipment suitable for drying potatoes may be used in the practice of the present invention. Suitable dryers can be selected from those well known drying devices such as fluidized bed dryers, scraped wall heat exchangers, drum dryers, freeze-dryers, air lift dryers, and the like. Preferred drying methods include the use of freeze drying, drum drying, infrared drying, drum drying used in combination with infrared drying when producing flakes. Air lift drying and fluidized bed drying is preferred when producing granules. A particularly preferred drying method utilizes a drum dryer and infrared panels.

Freeze drying may be accomplished using conventional freeze-drying equipment. The mash may be dried using a continuous method or batch method. Suitable freeze dryers include contact freeze driers, accelerated freeze driers, radiation freeze driers, microwave freeze driers, dielectric freeze driers. Preferably, due to their ability to handle large capacities, a contact freeze drier is used to dry the mash. Preferably, the mash is frozen at a rate such that damage to the cell structure of the potato is minimized prior to entering the freeze drying chamber.

Alternatively, the potato mash may be frozen in the chamber of the freeze dryer prior to starting the freeze-drying process (i.e., heating, sublimation, evaporation). The precise drying conditions are dependent on the type of food being dried and the type of freeze-dryer used.

When a drum dryer is used, the mash is fed to the top surface of the drum by conveying means. Small diameter unheated rolls progressively apply fresh potato mash to portions already on the drum, thus building up a sheet, or layer, having a predetermined thickness. Peripheral speed of the small rolls is the same as that of the drum. After the layer of mash travels around a portion of the circumference of the drum, a doctor knife removes the dried sheet by peeling the dried sheet away from the drum. Typically, the drum dryer itself is heated to temperatures within the range of from about 250° F. to about 375° F. preferably to a temperature of from about 310° F. to about 350° F., and more preferably from about 320° F. (160° C.) to about 333° F. by pressurized steam contained within the drum at pressures of from about 70 psig to about 140 psig. For best results the rotational speed of the dryer drum and the internal temperature thereof is suitably controlled so as to give a final product having a moisture content of from about 5% to about 12%, preferably from about 6% to about 10%. Typically, a rotational speed of from about 9 sec/rev to about 25 sec/rev., preferably about 11 sec/rev to about 20 sec/rev, is sufficient. The use of drum dryers is known in the potato industry.

The preferred process utilizes a single drum drier wherein the wet potato mash is spread onto the drum in a thin sheet having a thickness of from 0.005" to about 0.1", preferably from about 0.005" to about 0.05", more preferably about 0.01 inches.

Once the wet mash is sheeted and dried, the resulting dried sheet is then comminuted with, for example, an Urschel Comitrol, manufactured by Urschel Laboratories, Inc. of Valparaiso, Ind. Any method of comminution that minimizes the starch damage, such as grinding, cutting or pulverizing can be used.

In a particularly preferred embodiment drying and flaking of the wet mash is achieved by the simultaneous use of a drum dryer with infrared panels mounted outside the dryer.

By way of background, drum drying of mashed potatoes into dried potato flakes involves simultaneous heat and mass transfer. As the heat is transferred from the drum dryer to the flake to evaporate the water, the mass transfer occurs as the water migrates through the flake and to the surrounding environment. The inside surface of the mash refers to the mash surface in direct contact with the drum dryer. The outside surface of the mash refers to the opposite mash surface that is in direct contact with the surrounding environment. The drying rate of the potato mash is limited by the following parameters: 1) heat transfer from drum dryer surface to mash; 2) heat transfer through the mash; 3) heat transfer from the mash to external environment; 4) reduced mass (water) and heat transfer from the drum to the mash due to separation of the mash from the drum as the mash moisture level decreases; 5) mass transfer (water) through the flakes; and 6) mass ransfer (water) from the outer surface of the mash to the surrounding environment.

Figure 2:
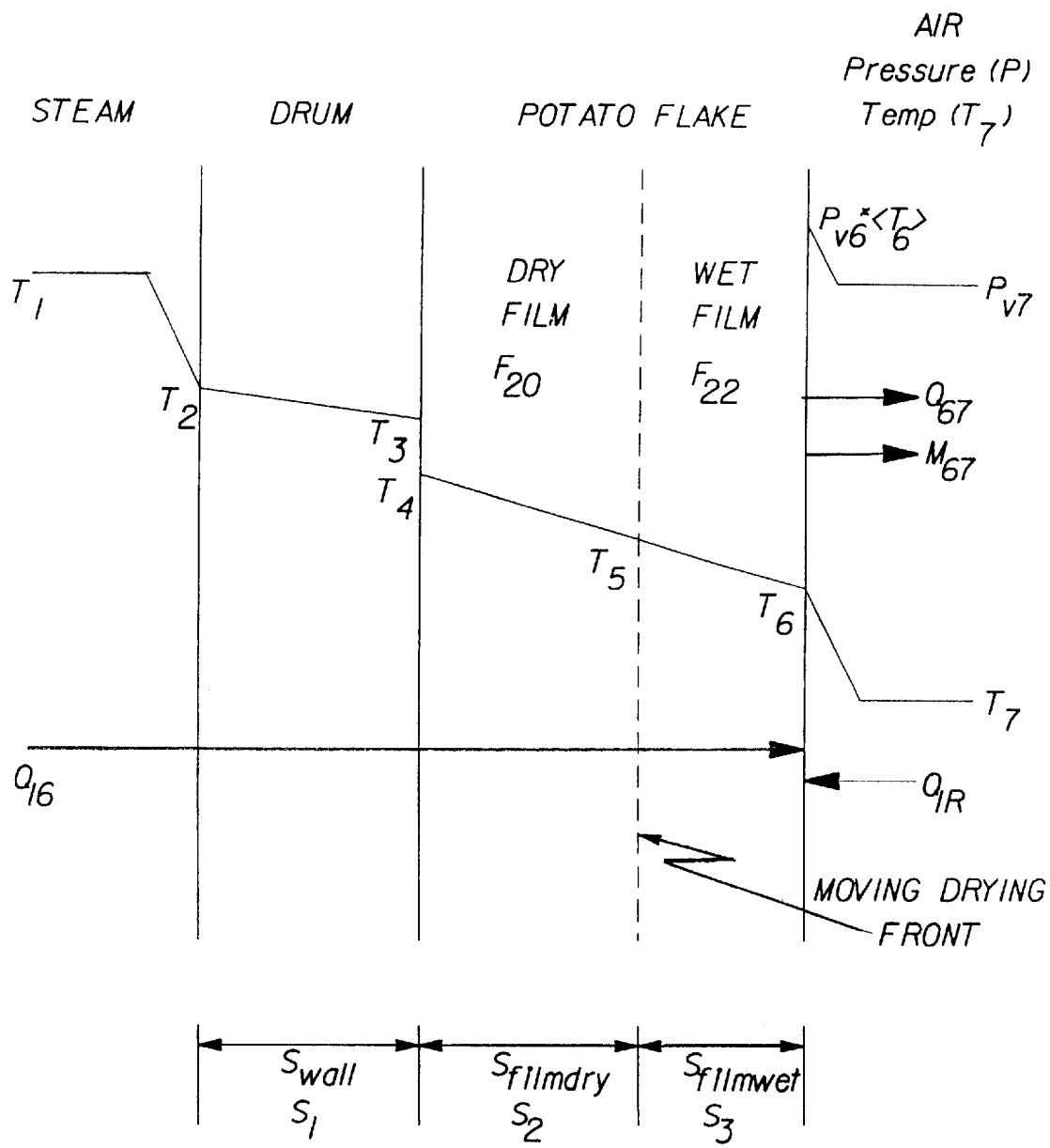
FIG. 2. Schematic illustration of heat and mass transfer through a layer of mash using combined drum dryer and infrared drying.

The combination of the drum dryer with infrared heating provides improved heat transfer through the mash layer and improved mass (water) transfer from the mash layer. FIG. 2 is a schematic illustration showing heat transfer through the mash layer and mass (water) transfer from the mash layer. In FIG. 2, $T_1$ is the drum internal steam temperature, $T_2$ is the internal drum temperature, $S_1$ is the drum wall thickness, $T_3$ is the external drum temperature, $T_4$ is the temperature at the internal surface of the mash, $T_5$ is the temperature at the interface of the mash dry film $F_{20}$ and the mash wet film $F_{22}$, $S_2$ is the thickness of the dry film $F_{20}$, $S_3$ is the thickness of the mash wet film $F_{22}$, $T_6$ is the temperature of the outer mash surface, $P_{V6}$ is the vapor pressure at the outer mash surface, $T_7$ is the surrounding temperature, and $P_{V7}$ is the vapor pressure at the surrounding temperature. $Q_{16}$ is the heat flux provided by the drying drum, $Q_{IR}$ is the heat flux provided by the infrared heat source, $Q_{67}$ is the heat flux from the outer surface of the mash, and $M_{67}$ is the mass transfer of water from the outer surface of the mash.

The combination of drum dryer with infrared heating enables a relatively higher heat flux through the mash and to the outside surface of the mash, than would otherwise be possible using only a drying drum. Infrared heating at the outside mash surface will raise the outside mash temperature relative to the conventional process. Without being limited by theory, it is believed that this results in higher vapor pressures at the mash outside surface, which in turn is believed to improve contact of the inside mash surface against the drum. This improved contact reduces separation of the mash inner surface from the drum at lower moisture levels, therefore improving heat transfer from the drying drum to the inner mash surface and providing an increase in drying rate.

Infrared heating of the outer surface of the mash also reduces cooling of the outer surface by the surrounding environment. Cooling of the outer surface results in a wet film at the outer surface (due to condensation), which reduces the mass transfer of the water through the mash to the surrounding environment. Infrared heating of the outer surface of the mash helps eliminate this wet film layer, so that the heat and mass transfer will be enhanced through the mash thickness, and the moisture content of the mash will be reduced. Accordingly, the drying process is accelerated.

The infrared heating is especially effective in the latter stages of drying (mash moisture content below about 50 percent). The infrared heating minimizes the mass transfer bottleneck that occurs at the outside mash surface. The elevated surface temperature and vapor pressure with infrared heating increases the mass transfer of water from the outer mash surface, providing the driving force to increase the drying rate. The infrared heaters provide this advantage, even though the heat flux provided by the infrared dryers can be one to two orders of magnitude lower than that provided by the drum dryer.

The net result is not only an increase in production capacity, but also an improvement in quality of the flakes, due to the lower residence time of the potato cells adjacent the hot dryer drum surface. This lower residence time results in less degradation reactions of flavor precursors and nutrients.

The combination of a drum and infrared panels substantially improves the drying performance of the mash when compared with conventional methods of drying. The use of the drum dryer with the infrared panels have a number of advantages. The use of this drying method in combination with the method used to prepare the potato mash described herein (1) substantially increases the production rate of dehydrated potatoes; (2) increases the speed of drying the potato mash under gentle conditions compared with conventional dryers; and in particular and (3) results in a product having less cell damage, lighter color and lower water absorption index, less processed flavors than potato flakes produced by conventional methods. Using infrared heaters is advantageous in that the heaters can be easily and precisely controlled. For example, the energy radiated from the heaters may be concentrated, focused, directed, and reflected in the same manner as light and the heaters can be zoned to provide uniform heating or a custom distribution of power density.

The equipment used to dry the wet mash comprises a steam drum dryer and infrared panels. Outside the dryer is mounted electrically heated infrared panels which irradiates its energy onto the material (e.g., wet mash sheet) formed on the outer surface of the dryer. The wet mash is exposed to two drying components. One component is contact drying, by the introduction of heat through the walls of the drum dryer (i.e., heat transfer). The drum dryer may be heated by, for example, hot water, steam or heating circuits. Typically, the drum is heated to a temperature in the range of about 250° F. (121.1° C.) to about 400° F. (204.4° C.), preferably about 320° F. (160° C.) to about 380° F. (193.3° C.), and more preferably about 330° F. (165.5° C.) to about 360° F. (182.2° C.) with steam having a pressure of about 70 psig to about 130 psig, preferably from about 85 psig to about 120 psig, and more preferably about 90 psig to about 100 psig.

The infrared drying panels suitable for use emit in the wavelength short to far spectrum range of from about 0.7 microns to about 100 microns. For use in the present invention, infrared drying panels preferably have a wavelength of from about 0.7 microns to about 50 microns, preferably from about 0.7 to about 10 microns, more preferably from about 0.7 to about 0.9 are used. Preferably, the radiation characteristics of the infrared panel can be controlled by means of a thermocouple-controlled temperature-regulating device. Preferably, the panel have a density in the range of about 2 W/in$^2$ to about 40 W/in$^2$, more preferably from about 3 W/in$^2$ to 18 W/in$^2$ and most preferably from about 4 W/in$^2$ to about 12 W/in$^2$. This density covers a temperature output of the panels of about 300° F. (148.8° C.) to about 1000° F. (537.7° C.). "Density" as used herein refers to the power required per unit area to radiate energy and achieve a temperature of the panel.

Examples of infrared panels that may be used include, but are not limited to, panels comprising halogen lamps, non-halogen cycle lamps, quartz tube lamps, filament wire lamps, burner tubes, metal sheath rods, panel heaters and the like. Configuration of the panels include, but is not limited to hyperbolic, concave, ellipsoidal, parabolic. Additionally the infrared energy may be applied using a single flat panel, multiple panels, bulbs, spot heaters, line heaters, strip heaters, area heaters and chamber heaters.

The panels are positioned around the circumference of the drum to provide infrared heating of the second surface of the mash layer. The panels are preferably positioned such mash is first dried only with the dryer drum, followed by simultaneous drying of the mash by both the dryer drum and the infrared source. The panels can be positioned to provide infrared heating of the second surface of the mash after the mash layer has been dried to a moisture content of less than about 70%, more particularly less than about 60%, still more particularly less than about 50%, still more particularly less than about 45% and preferably no more than about 40%. In one embodiment, the panels are positioned to begin heating the second surface of the mash after the mash layer has been dried to a moisture content of between about 30% and about 40%.

The panels are located such that the panels direct infrared energy towards the second surface of the mash. The wet potato mash is exposed to the infrared radiation before being removed from the drum by the doctor knife. Preferably, the panels are located as close as possible to the second surface of the mash, preferably less than or equal to about 2 inches and in one embodiment less than about 1 inch.

Figure 3A:
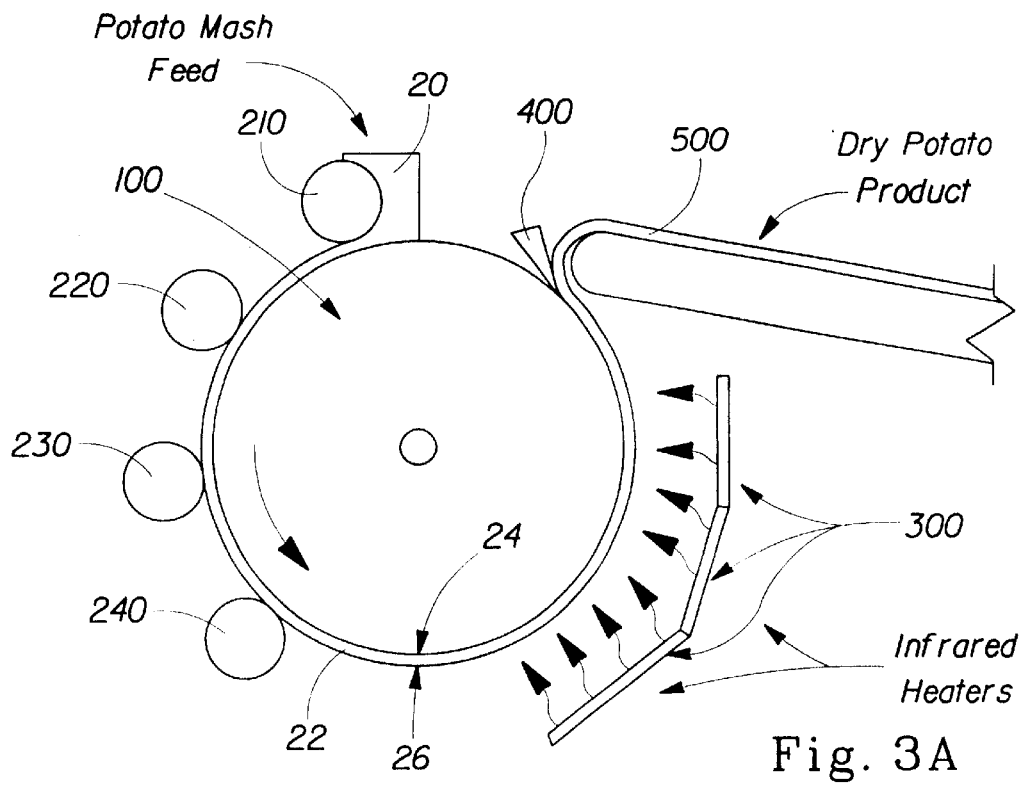
FIG. 3A. Schematic illustration showing drying of a mash using a drum dryer in combination with infrared heating panels according to one embodiment of the present invention.

Referring to the embodiment shown in FIG. 3A, potato mash 20 is deposited onto the surface of a drying drum 100, and applicator rolls 210, 220, 230, and 240 provide a mash layer 22 having a predetermined thickness on the drum 100. The mash layer 22 has a first surface 24 in contact with the drum 100 and a second oppositely facing surface 26. A plurality of infrared heating panels 300 are shown associated with the drum 100. In FIG. 3A, the panels are positioned to initiate infrared heating of the mash layer about 180 degrees or more after initial deposition of the mash layer at the top of the drum, and after the mash has passed under the final applicator roll 240. Accordingly, the first surface of the mash in contact with the drum is heated by the drum over more than 90 degrees of travel around the drum prior to infrared heating of the second surface of the mash. In the embodiment shown in FIG. 3A, the infrared panels are positioned to initiate heating of the mash layer at the bottom of the dryer drum. A doctor blade 400 removes the dry potato product 500 from the drum surface.

Figure 3B:
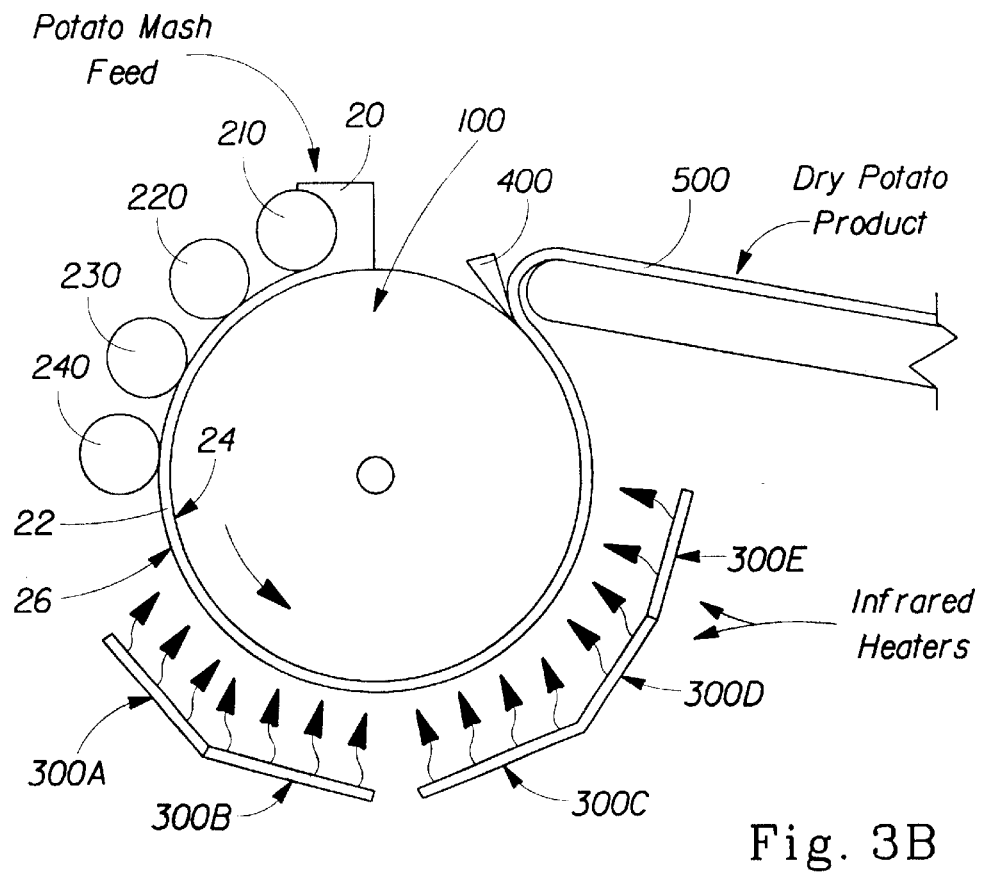
FIG. 3B. Schematic illustration showing drying of a mash using a drum dryer in combination with infrared heating panels according to one embodiment of the present invention.
Figure 3C:
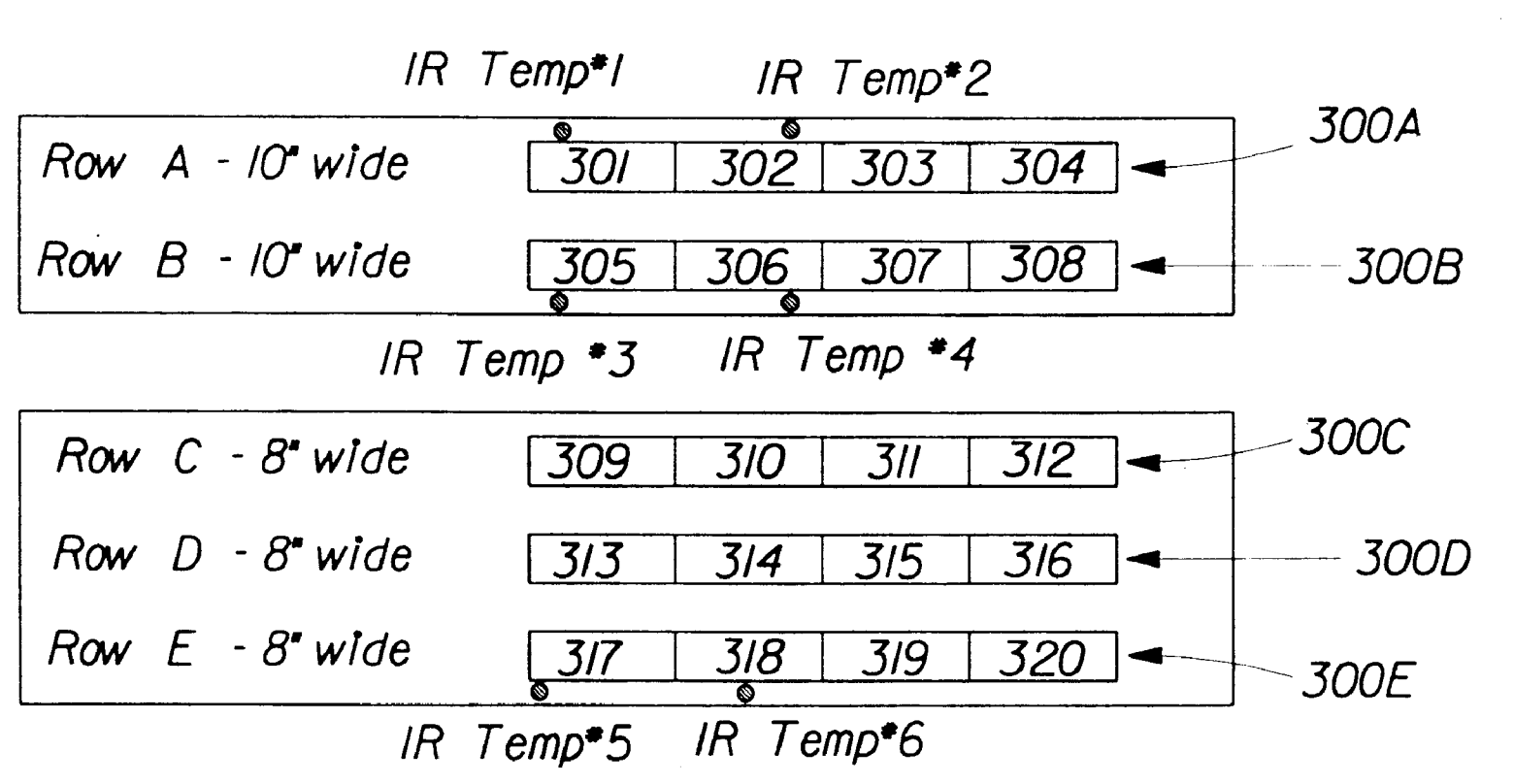

In the embodiment shown in FIGS. 3B/3C, the source of infrared energy comprises five rows (300A–300E) of infrared heating panels 300, each row including four panels. The panels, numbered 301–320 in FIG. 3C, are arranged to cover the surface of the mash on the drum intermediate the last applicator roll 240 and the doctor blade 400.

The temperature of each of the panels can be independently varied, panel to panel and/or row to row. Accordingly, the infrared heat energy applied to the mash can be varied circumferentially around the drum (row to row) or across the width of the drum (from panel to panel within a row). Depending upon the particular application, one or more panels in or more rows can be turned off.

One preferred process for preparing dehydrated potato flakes include the steps of (a) cooking potatoes using microwave energy, shredding and mashing the potatoes, and (b) freeze-drying the potato mash. Another preferred processes for preparing dehydrated potato flakes include the steps of (a) boiling whole, raw, unpeeled, potatoes, (b) shredding and mashing the potatoes, and (c) drying the potato mash using a drum dryer simultaneously with infrared panels.

Alternatively, the wet potato mash may be used to prepare potato granules, flanules, as well as mash potatoes, french fries, or other potato products. This method comprises cooking the potatoes according to the method described herein above. The mash and the "add back product" (i.e. potato granules or flakes previously dried) are combined. The combining of the wet mash and add back product helps to reduce the amount of water present in the wet mash. Various amounts of add back product may be combined with the wet mash. Generally, the mash comprises from about 50% to about 85%, preferably from about 75% to about 80% add back product depending on the desired moisture content of the finished granules. As a result of the mash addition, the temperature of the product drops to a temperature in the range of from about 145° F. (62.7° C.) to about 155° F. (68.3° C.).

Starch may also be added to the mash prior to drying the potato granules and flanules. The process for preparing flanules differ from conventional granulation processes in several ways: a) potatoes are not peeled during the process of making flanules; b) precooking and cooling of the potatoes prior to cooking is minimized; c) conditioning time and post cooling are controlled and reduced. These conditions provide flanules having cleaner flavor, increased free amylose, increased water absorption capacity and produce desirable rheological properties, when mixed with other ingredients to form doughs, such as doughs for the manufacture of fabricated chips. Elimination of peeling ensures not overheating of the outer surface of the potatoes avoiding swelling of cells and increasing heat and mass transfer to the center of the potatoes. Elimination of precooking, precooling, conditioning and post cooling in the flanules process, ensures control of cell expansion, cell breakage and therefore water absorption capacity of the dry product.

In the flanules or granules process, the starch may be added directly to the mash or mixed with the add-back dry material. Alternatively, the starch may be directly used as the add-back dry material. The starch may be added at different points of addition to achieve specific residence time and temperature to reach various degrees of gelatinization of the starch, reduce agglomeration and form a homogeneous mash. The starch addition to the flanules process (as well as in the flaking process), has several potential benefits: 1) as a source of free amylose when the cooking time is significantly reduced resulting in limited cell breakage, 2) the water absorption capacity of the flanules can be increased without causing agglomeration problems, and 3) increase of drying rates by increasing the percent of solids in the mash.

After mashing and mixing, the combined mash is cooled at a temperature of about 100° F. (37.7° C.) to about 110° F. (43.3° C.). Cooling is generally achieved with fresh air at ambient temperature or a temperature of about 70° F. (21.1° C.) in a vibrator cooler or fluidized bed with a residence time of less than about 1 minute. Of course the time of cooling will vary depending on the volume of mash present. Cooling has a significant effect on water absorption capacity and flavor of the resulting granules. The degree of cooling will determine the level of the starch retrogradation and level of cell expansion.

After the dried add-back product is mixed with the cooked potato mash, the conditioning starts. Conditioning of the mash is typically done by placing the mash on a belt for about 4 to about 60 minutes. During this time the potato mash equilibrates as water migrates from the wetter mash particles to the dry particles of the add-back stream and starch retrogradation occurs. Measurement of particle size distribution is critical at the end of conditioning to ensure that no graininess or lumpiness is present as a result of the add-back process. If a large extent of particles are formed after the adding-back of the recycle material, the particle size distribution will continue to increase due to the limited water absorption of the large particles. The cooled mash is then mixed. The mixing is done to break any aggregates that form during the conditioning step.

The potato granules, and flanules are then air dried with for example a cyclone or air-lift drier using hot air at about 450° F. to a moisture content of about 16% and screened to separate granules into various particle sizes (i.e., granulation). Screening is typically done to separate different major fractions (different particle size distribution) of the product which are separated into three groups: 1) the coarse material, which include big pieces of raw potato and some peel (used for animal feed), 2) the intermediate particle size, which is added back to the mash to lower the moisture content, and 3) the fine material which goes to final drying. Satisfactory granulation is very important for achieving the desired physical properties in the granules, including the formation of individual cells having minimal breakage. Granulation is optimum when the moisture level of the moist mix is about 25% to about 45%.

Final drying can be performed in a fluidized bed to lower moisture content from about 16% to about 6%. The granules are then cooled at room temperature.

PHYSICOCHEMICAL PROPERTIES OF THE POTATO FLAKES

Potato variety, specific gravity, age, storage, reducing sugar content, and processing conditions affect the physiochemical properties of potato flakes. The process used to peel, cook and dehydrate the potato flakes can be primary determinants of the physical properties and general quality of the final dehydrated product. The process for producing flakes can be modified to produce flakes for a given application. Such modifications can produce flakes having a range of water absorption index, free amylose level, paste viscosity and/or flakes having reduced levels of thermal degradation products, increased levels of Vitamin C, improved color retention, less processed flavor, and less cell breakage. The desired physical properties will depend upon which steps are used during processing of the dehydrated products. The processing steps will impact the level of broken cells, as well as the degree of cell expansion, which in turn will affect physical properties (e.g. color and WAI) and composition of the flakes (e.g. nutrients and flavor precursors).

It has been found that certain process steps result in flakes having unique and surprising advantages over conventionally produced flakes. A few of the unique and surprising advantages that result from using the processing steps of the present invention are as follows:

(1) using the cooking methods described above ("Reduced Cooking") and drum drying can result in flakes having:
  (a) increased Vitamin C;
  (b) fewer broken cells;
  (c) lighter color;
  (d) lower WAI;
  (e) lower percent of free amylose; and
  (f) lower concentration of Strecker aldehydes (methional, phenylacetaldehyde, 2-methylbutanal, 3-methylbutanal)

(2) using the cooking methods described above ("Reduced Cooking"), and adding starch to the mash ("Coflaking") prior to drum drying can result in flakes having:
  (a) increased pore size;
  (b) increased free amylose levels;

(c) increased peak and final paste viscosity; and (d) lighter in color (e) fewer less broken cells (f) lower concentration of Strecker aldehydes (methional, phenylacetaldehyde, 2-methylbutanal, 3-methylbutanal)

(3) using the cooking methods described above ("Reduced Cooking") and drum drying in combination with infrared drying ("Infrared") results in potato flakes having:

(a) lower water absorption index, (b) lower peak and final paste viscosity (c) increased Vitamin C, (d) lower concentration of Strecker aldehydes (methional, phenylacetaldehyde, 2-methylbutanal, 3-methylbutanal); and (e) lighter color than control flakes; (i.e., less browning during flaking)

(4) using the cooking methods described above ("Reduced Cooking"), the addition of starch ("Coflaking") and the combination of drum drying with infrared drying ("Infrared") results in flakes having (a) fewer broken cells, (b) lower WAI, (c) increased free amylose levels, (d) lighter color, (e) increased Vitamin C; and (f) increased porosity (g) lower concentration of Strecker aldehydes (methional, phenylacetaldehyde, 2-methylbutanal, and 3-methylbutanal).

The preferred dehydrated flakes are produced by processes in which (1) whole potatoes, potato pieces and/or slices are cooked by boiling, steaming or a combination of both, the potatoes are then shredded and mashed; the mash is dried using a combination of infrared heating and drum drying; and (2) the aformentioned process in which a ungelatinized starch is added to the mash prior to infrared heating and drum drying.

WATER ABSORPTION INDEX (WAI)

Water absorption index is a parameter that indicates the capacity of a starch containing material such as potato flakes to hold water. It is directly proportioned to the degree of swelling of the potato cells during cooking/gelatinization. Water absorption index, is also an indirect measurement of the level of cell breakage. Raw potatoes have a low water absorption, which increases, as the starch starts gelatinizing during the cooking step, and continues with increased cell damage during drying. Both prolonged cooking times, as well as high temperature and residence time during drum drying can, to a certain extent, result in an increase in water absorption index of the potato flakes, after which the cell wall collapses and the water absorption drops. This initial increase in WAI as cooking time/temperature is increased, up to a maximum WAI, followed by a decrease in WAI with further increase in cooking time, corresponds at least in part to the functional relationship between paste viscosity of the starch containing material eing cooked and the temperature of cooking.

Introduction of a second source of energy to drum drying such as Infrared heating results in a significant reduction of residence time of the potato mash on the drum. This results in less damage to the potato cells, which represents less cell expansion and less breakage, which also correlates to flakes with lower water absorption index. Potato flakes made by significantly reducing the cooking time of unpeeled potatoes can lower the water absorption index value due to lower levels of starch gelatinization and expansion of potato cells. The water absorption index of the dehydrated potato flakes can also be altered by adding materials with a significantly lower water absorption than to the mashed potatoes before drying such as native wheat starch. Water absorption of flakes can also be affected by the specific WAI of materials utilized as co-flaking agents. The addition of wheat starch can result in a reduction in the WAI of the resulting flakes.

In the process of making fabricated chips, the WAI is believed to correlate to the level of oil that will be absorbed in the final product during the frying process and to product expansion during frying. It is also believed to correlate to reduction in fat absorption with potatoes of higher solids content in potato chips.

The dehydrated potato flakes of the present invention can have a water absorption index (WAI) ranging from about 7.5 to about 11, preferably from about 7.7 to about 10; and still more preferably from about 8 to about 9.

PERCENT OF FREE AMYLOSE

Dehydrated potato flakes produced according to the present invention also preferably comprise at least 14%, more preferably at least 18 percent, and still more preferably at least 20 percent free amylose. The percent of free amylose is a measurement of the free starch in the potato flake. The level of free amylose in the finished dehydrated potato flakes is controlled by the degree of cooking of the potatoes, and the complexation of the free amylose with monoglycerides prior to drying, as well as grinding. Also, the level of free amylose can be increased by the addition of a high amylose-containing starch during the flaking process (e.g. wheat starch, modified corn starch, rice starch, pea starch). If starch, is added to the mash during processing the dehydrated flakes can comprise from about 14% to about 30%, more particularly from about 19% to about 26%, and still more particularly from about 20% to about 24% free amylose.

Infrared heating in combination with drum drying, reduces the level of free amylose in the finished flakes, due to less cell expansion and cell breakage.

In the manufacture of fabricated snacks, especially for sheeted products, the percent of free amylose is very important to ensure good sheetability at high speed processability of doughs. Low level of free amylose in the dough often results in the presence of pinholes. Therefore, in the manufacture of fabricated snacks high levels of free amylose is desired. However, as the level of cell breakage is reduced due to reduced cooking time, or by reducing the residence time during drying (such as by using infrared heating), the level of free amylose tends to decrease. Accordingly, a method according to one aspect of the present invention combines reduced cooking and infrared drying with the addition of alternate sources of free amylose to the wet mash. Addition of free amylose is particularly important in the manufacturing of granules, where the level of soluble starch can be very low.

It can also be desirable to add to the wet mash an additive or ingredient which is relatively high in amylopectin. For instance, a waxy corn starch can be added to increase the amylopectin content of the mash, which can result in increased water absorption and expansion of the fabricated chip if the starch is pregelatinized. Further different textures can be generated by the addition to the wet mash of waxy starches, modified starches, crosslinked starches, substituted starches, instant starches, and combinations thereof.

High levels of flanules or granules can be used in the dough for making fabricated chips by incorporating an additional starch that produces expansion of the dough during frying and increases dough cohesiveness in extruded chips. An additive high in amylopectin content, especially waxy starch, can be added to the mash to enhance the extrusion of dough. Normally, dehydrated potatoes are not a particularly preferred raw material for extrusion. However, by adding a waxy starch or modified starch to the potato mash, it is believed that the final dehydrated potatoes can have enhanced resistance to shear, temperature, and pressure, so that a cohesive dough and good product expansion can be obtained.

PERCENT OF BROKEN POTATO CELLS

The potato cells are defined as the individual pockets surrounded by cellulosic material, which contains not only the amylopectin, and amylose, but also the water soluble flavor precursors, as well as nutrients, minerals, lipids, proteins, and combinations thereof.

In starch containing materials such as potatoes, during cooking of the starch, the cells expand, increasing in size accordingly with the swelling power of the starch (depending on percent of solids of the potatoes, potato variety, age, etc.). In the flaking operation, the main goal is to dehydrate the potatoes without causing a significant detriment to the quality of the products, which represents cell separation and minimum cell damage. The conventional teaching is that the potatoes needed to be completely cooked (starch completely gelatinized), and the potatoes needed to be blanched to obtain a quality product and prevent excessive browning. The present invention obtains high quality potato flakes without completely gelatinizing the starch, leaving the ungelatinized fraction to be gelatinized in the subsequent process steps (frying, baking, extrusion, etc.), and provides flakes with a lighter color without the need for additional blanching of the potatoes.

There are several parameters that are measured from the morphology of the potato cells with the use of a light microscope: including percent of broken cells, cell expansion, and cell separation.

Cell separation is the distance among the cells during starch hydration, swelling and gelatinization. Cell separation changes (increases) during cooking. Cell breakage occurs due to the time and temperature profile during cooking and drying, as well as the shear applied to the mashed potatoes during drying and grinding. Grinding severely damages the potato cells. By controlling the grinding method, grinding conditions, and the level of grinding, the level of broken cells can be reduced significantly. This will result in a denser texture for the fabricated snack, similar to a conventional snack chip (such as potato chips made from sliced potatoes). When potato cells break the free amylose leaches out of the cell increasing stickiness of the mash. The excessive stickiness is compensated by adding monoglycerides to complex some of the free amylose. In the present invention, the potatoes cells are cooked only to the point of causing partial cell separation, specific cell expansion and a minimum level of broken cells.

The percentage of broken cells is determined by light microscope and is an indication of the degree of cook and starch damage that has occurred during mashing, ricing, shredding and/or grinding. A large number of broken cells indicate improper processing conditions, such as, overcooking, overheating during drying or use of too much shear and/or reducing the particle size of the potatoes by using an apparatus that applies too much shear, (e.g. a hammer mill) among other things. The dehydrated potato flakes produced by the practice of the present invention comprise less than about 70% broken cells, preferably less than about 40% broken cells, more preferably less than about 30% broken cells, even more preferably less than about 25%, and still more preferably less than about 20% broken cells. The level of broken cells is surprisingly reduced when starch is incorporated into the mash and when the mash is dried using infrared heating and drum drying.

Figure 4A:
FIGS. 4A, B, C: Photomicrographs (80×) of potato cells from flakes made using the standard cooking/drying procedure.
Figure 4B:

FIGS. 4A and 4B are used as a reference for comparison to illustrate the method of measuring and identifying broken cells. These photomicrographs (of a light microscope image at 80×magnification) show samples of potato flakes with different levels of broken cells. The arrows in the pictures show a broken cell. FIG. 4A shows a sample with less than 50% broken cells. FIG. 4B shows a sample with more than 50% broken cells.

Figure 4C:

FIG. 4C is a light microscope image also at 80×, showing about 50% broken cells in flakes made by using the conventional process of making potato flakes.

Figure 5:
FIG. 5. Photomicrograph (80×) of potato cells from flakes made using drum drying in combination with Infrared heating.

FIG. 5 is a photomicrograph of a light microscope image showing a sample of potato flakes made according to one embodiment of the present invention, wherein potato flakes are dried with infrared drying in combination with the drum drying. The level of the broken cells is less than 20%.

Figure 6:
FIG. 6. Photomicrograph (80×) of potato cells from flakes made with reduced cooking and dried with drum drying in combination with infrared drying, according to the present invention.

FIG. 6 is a photomicrograph of a light microscope image of potato flake cells made with whole potatoes, reduced cooking, and infrared drying in combination with drum drying. The level of broken cells is about 25%. This level of broken cells could be due to the shearing effect on the mashed potatoes due to the presence of ungelatinized pieces.

Figure 7:
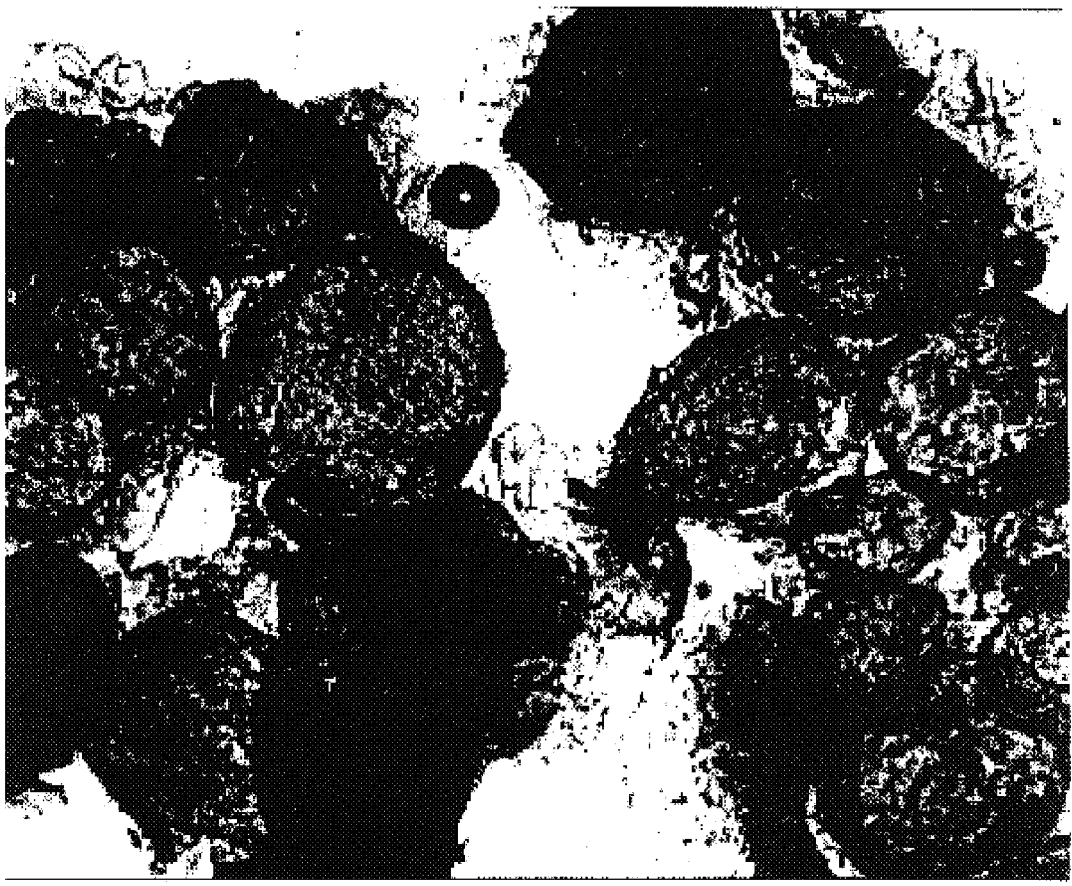
FIG. 7. Photomicrograph (63×) of potato cells from flakes made using reduced cooking, co-flaking (addition of wheat starch to the potato mash) and dried with drum drying in combination with infrared drying.

FIG. 7 is a photomicrograph of a light microscope image of potato flake cells, the flakes made by reduced cooking potatoes for no more than 15 minutes with steam (sliced, partially peeled) to form a mash, adding wheat starch to the mash, and then drying the mash with a combination of infrared heating and drum drying. The level of broken cells is about 10%. The presence of gelatinized wheat starch is evident around the cells.

TOTAL PORE AREA

Pore volume and intrusion data is measured using the Micromeritics PoreSizer 9320 Mercury porosimetier, Micromeritics, Norcross, Ga. The sample is placed in the porosimeter and bathed in mercury. The pressure is stepped up to 30,000 psia and the mercury intrudes between particles and into the pores. The amount of intrusion is monitored and is used to calculate the results. The corresponding equation for pore volume and pore area used in the calculation are as follows:

Volume=$\pi d^2/4*L$ is the volume of a cylinder, where d is the diameter of the pore and L is the length of the pore. The assumption is made that L=d in which case volume is equal to $\pi d^3/4$.

Wall Area of Pore=$\pi d*L$ ignoring the bottom and top surface of the pore.

Table 2, below, shows that infrared drying ("IR") in combination with drum drying in accordance with the present invention reduces the total pore area of the flakes relative to flakes dried using conventional methods. Addition of wheat starch to the mashed potatoes prior to drying with IR in combination with drum drying provides a pore area that is lower than that of the conventionally dried flakes, but higher than that of the flakes made without wheat starch addition and dried with IR/drum drying. Table 2 also illustrates a decrease in bulk density for the samples dried with IR/drum drying according to the present invention, as compared to the bulk density of conventionally dried flakes.

TABLE 2

Total Pore Area of Potato Flakes

| Sample | Total Pore Area (sq. m/g) (avg of three measurements) | Average Bulk density (g/cc) |
|---|---|---|
| Conventional Drum drying | 4.09 | 0.726 |
| IR/Drum drying | 3.69 | 0.503 |
| Co-flake with wheat starch and IR/Drum drying | 3.74 | 0.567 |

The dehydrated flakes produced by drying with infrared drying in combination with drum drying according to the present invention can have a total pore area of less than about 4 square meter/gram, and in one embodiment from about 3 sq.m/g to about 3.8 sq.m/g. Without being limited by theory, it is believed that by reducing the residence time of the mashed potatoes on the surface of the drum the pore size becomes smaller, which may correlate with lower level of broken cells. It is believed that as the potato cells break, the amylopectin already gelatinized and therefore swollen is released from the cell to absorb water and reduce water and amylose mobility. This may result in increasing pore size and increased thickness of dried potato sheets. Also, as the level of broken cells is reduced, the amylopectin is contained and does not absorbs excessive amounts of water, which can result in a thinner sheet of potato material coming off the dryer drum.

MOISTURE

The dehydrated potato flakes comprise from about 5% to about 14%, preferably from about 5% to about 12%, more preferably about 6% to about 9%, and still more preferably from about 7% to about 8% moisture. Finished moisture content of potato flakes is one of the levers to control the retention of Vitamin C (as well as other nutrients). The higher the moisture content of flakes the higher the Vitamin C content. However, at high moisture content, the stability of the flakes deteriorates due to mold growth and/or oxidative reactions.

COLOR

There are four types of browning reactions in foods: Maillard, caramelization, ascorbic acid oxidation, and phenolase browning. The former three are non-enzymatic (sometimes oxidation of ascorbic acid is catalyzed by enzymes). Dehydrated fruits and vegetables are subjected to all three types of browning, either as raw material, during processing, or during storage. Enzymatic browning occurs on cut surface of light colored fruits and vegetables, such as apples, potatoes, etc. Exposure of the cut potato surface to air causes rapid browning due to the enzymatic oxidation of phenols to orthoquinones, which in turn polymerize to form brown pigments or melanings. The enzymes that catalyze these reactions are: phenolases, polyphenol oxidases, tyrosinases, or catecholases. Tyrosine is a major substrast for certain phenolase in most plant tissues, as well as chlorogenic acid (O. Fennema, 1985). Biochemical changes occurring during storage also result in the development of off-flavour and odour as well as discoloration of the product.

A further advantage of the present invention is that it produces a dehydrated material having improved color. This is believed to be due to not only deactivation of the enzymes responsible for enzymatic browning (polyphenol oxidase, or phenolase), but the process is also believed to decrease the non-enzymatic browning reactions, which is the reaction between amino acids and reducing sugars (Maillard reaction). The Maillard reaction is also responsible for changes in color in the dehydrated flakes. Without being bound by theory, it is believed that the improved color of the flakes of the present invention is due, at least in part, to the reduction of residence time resulting from the improved processess of the present invention. Control of the Maillard reaction is important in the process of making fabricated snacks via baking, drying, or frying. Starch containing materials having less than about 4% reducing sugars, preferably less than about 3%, and more preferably less than about 2%, can be preferred. For example, potatoes of low reducing sugars (i.e. <1.5%) are preferred for fried snacks due to fewer browning reactions occurring during frying.

Samples of flakes can be analyzed for color changes both as dry ingredient (Hunter Colorimeter) and as soluble components (photometrically).

TABLE 3

Hunter Colorimeter values for "a", "b", and "L" for potato flakes.

| Sample | IR | Cooking | Additives | a | b | L |
|---|---|---|---|---|---|---|
| S | IR/950° F. | *Control Cooking | 10% WS | −2 | 13.9 | 85.4 |
| V | IR/950° F. | *Control Cooking | None | −1.6 | 17.4 | 79.6 |
| BB | IR/950° F. | Whole potatoes under water | None | −.3 | 19.1 | 73.6 |
| L | IR/360° F. | Whole potatoes under water | 10% WS | −1.8 | 16.6 | 81.6 |
| B | No IR | Steam 15 min/ ¼" slice | 10% WS | −1.5 | 14.4 | 80.6 |
| O | IR/360° F. | Whole potatoes under water | 10% Malto-dextrin | −1.8 | 17.7 | 77.9 |
| N | No IR | Whole potatoes under water | 10% Malto-dextrin | −1.9 | 16.9 | 78.7 |
| CC | No IR | *Control Cooking | None | 0.4 | 22.7 | 77.3 |
| U | No IR | Whole potatoes under water | None | 2.2 | 20.7 | 66.6 |
| DD | No IR | *Control Cooking | 10% WS | −1.2 | 17.8 | 82.4 |
| AA | IR/950° F. | French Fry Cut ¼" × ¼" | None | −0.7 | 17.5 | 78.9 |
| M | No IR | Whole potatoes under water | 10% WS | −1.6 | 15.5 | 82.4 |
| EE | No IR | French Fry Cut ¼" × ¼" | None | 0.7 | 20.3 | 75.4 |
| Q | IR/360° F. | Steam 15 min/ ¼" slices | 10% WS | −1.3 | 13.8 | 81.2 |
| Control 1 | No IR | *Control Cooking | None | 5.3 | 19.3 | 80.8 |
| Control 2 | No IR | *Control Cooking | None | 5.2 | 21.2 | 77.6 |
| Control 3 | No IR | *Control Cooking | None | 3.6 | 18.7 | 82.6 |
| Control 4 | No IR | *Control Cooking | None | 4.3 | 20.6 | 74.8 |
| Control 5 | No IR | *Control Cooking | None | 5.5 | 25.4 | 75.8 |
| Control 6 | No IR | *Control Cooking | None | 3.6 | 20.4 | 79.5 |
| Control 7 | No IR | *Control Cooking | None | 5.3 | 23.3 | 74.4 |

*Control Cooking = steam 40 min /½" slices

The dehydrated potato flakes produced according to the present invention are typically lighter in color than potato flakes produced by conventional flaking processes. The lightness of color is determined by using the Hunter Color Meter, HunterLab, Reston, Va. This instrument simulates the color perception seen by the human eye. "L", "a", "b", are the coordinates in a color plane. The "L" scale is from black to white, "a" is from green to red, and "b" is from blue to yellow. Potato flakes comprising starch will generally have a higher "L" value and a lower "a" and "b" value than potato flakes produced using conventional methods.

Figure 8:
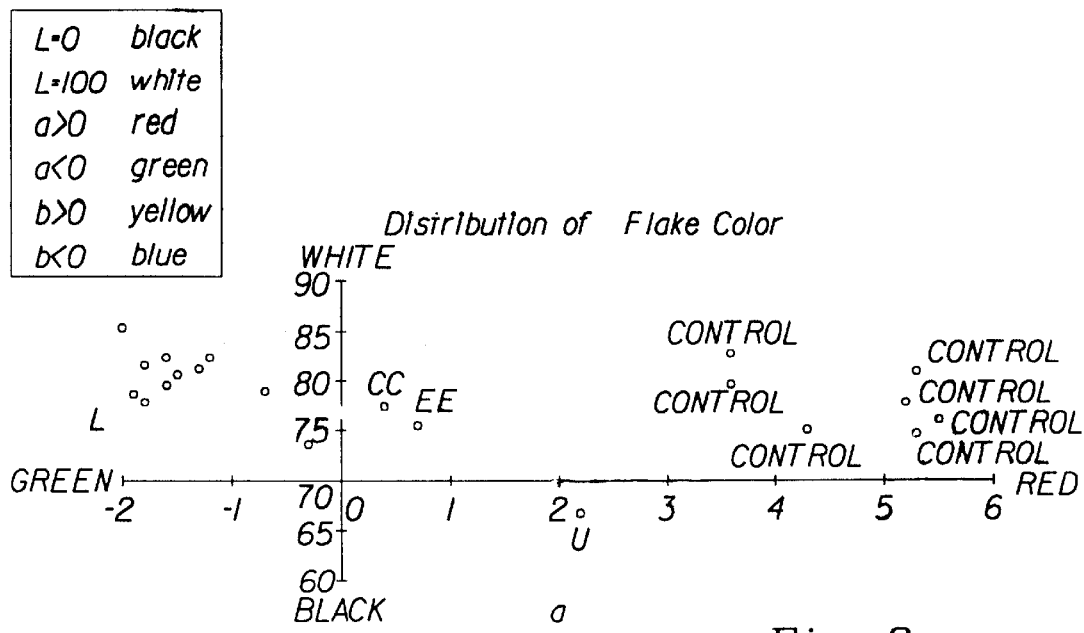
FIG. 8. Graphical Illustration of color values using Hunter Scale for the potato flakes made with different processes.

Typically potato flakes produced by the present invention comprise a "L" value greater thatn about 78 Hunter, and "a" value less than 0 Hunter and a "b" value less than 21 Hunter, as measured with a Hunter colorimeter according to the procedure set forth below. The flakes of the present invention preferably comprise a "L" value of from about 79 to about 86, preferably from about 80 to about 85, and more preferably from about 81 to about 83 Hunter. The potato flakes prepared according to the present invention comprise an "a" value of from about −1 to about −3, preferably from about −1.3 to about −2.7, and more preferably from about −1.6 to about −2.5 Hunter. The flakes produced by the process of the present invention additionally comprise a "b" value in the range of about 13.8 to about 21, preferably from about 17 to about 19, more preferably from about 16.5 to about 17.5 Hunter. FIG. 8 shows the color reading using the Hunter Color Scale for flakes made comparing different flakes made with different processes.

Table 3 shows the color reading values for flakes made by using different process conditions.

The flakes of the present invention can also be analyzed by measuring the absorbtion characteristics of soluble components of the flakes., An absorbance scan of the flakes according to the present invention includes a peak in the range of 260–280 nm, which is the typical range for proteins. Tyrosine is one of the free amino acids in potatoes responsible for darkening of the potato flesh, the so-called enzymatic discoloration. Among natural amino acids from proteins, tryptophan, tyrosine, and phenylalanine absorb ultraviolet light and have a maximum absorbance at 278, 274.5, and 260 nm respectively. Flakes made according to the present invention, including flakes made with IR heating and coflaking with wheat starch, exhibit lower absorbance versus conventional flakes.

Potato flakes of the present invention can have a Relative Absorbance Index which is lower than that of conventional flakes. The Relative Absorbance Index (RAI) is defined as:

Relative Absorbance Index=As/0.042, where As is the absorbance of the sample measured at 265 nm.

Figure 10:
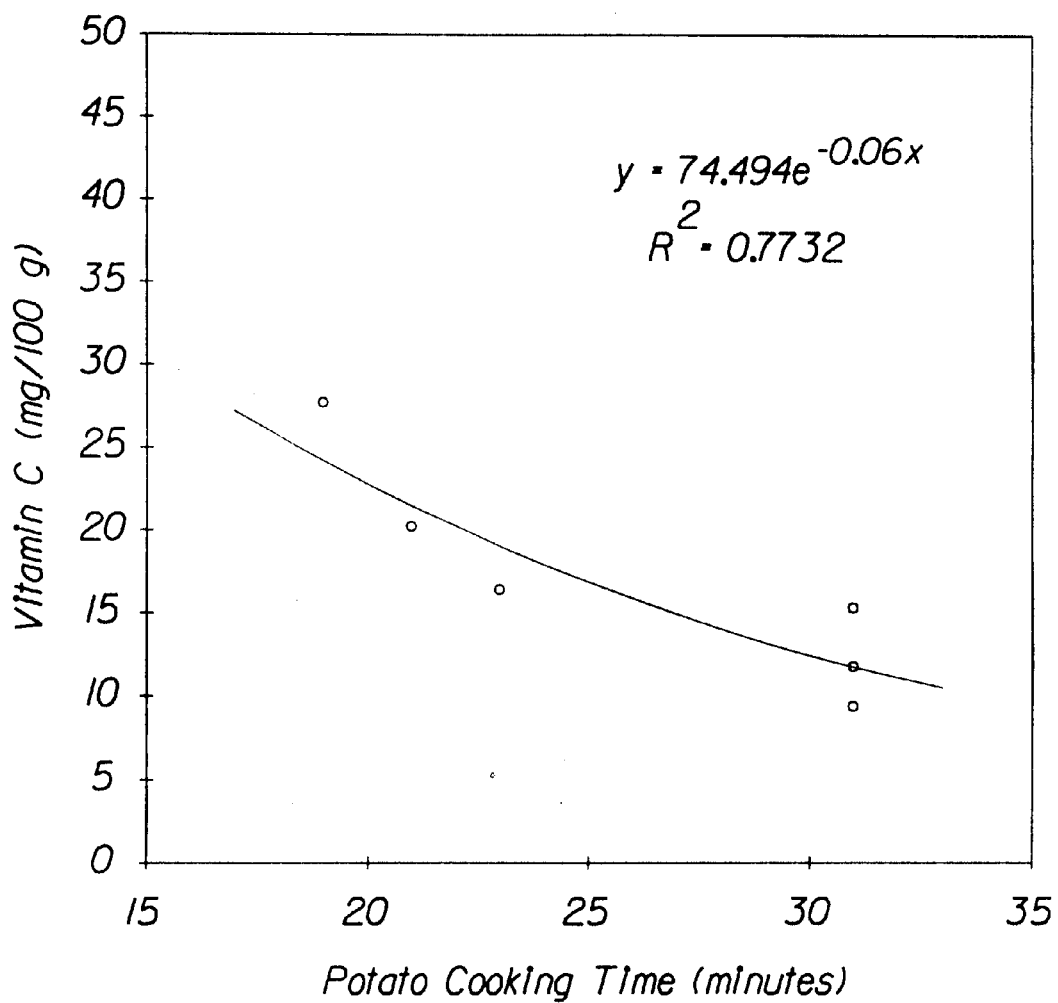
FIG. 10. Graphical illustration of Vitamin C content of potato flakes processed by cooking for different times.
Figure 11:
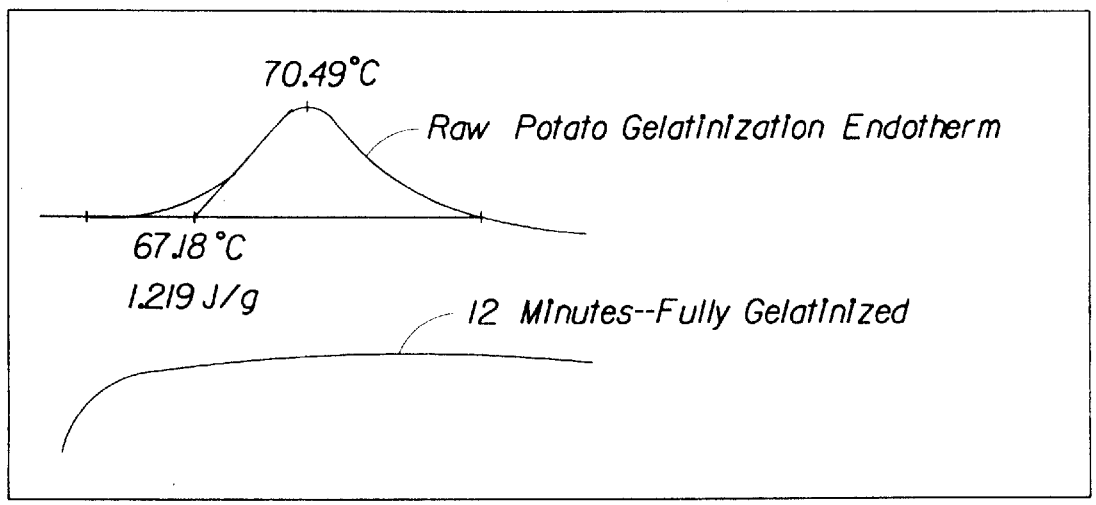
FIG. 11. Graphical illustration of Enthalpy of Gelatinization for raw potatoes and cooked potatoes.

Potato flakes of the present invention can have a Relative Absorbance Index of less than 2, more particularly less than 1.5, and in one or more embodiment less than 1.25. FIG. 10 shows the relative absorbance for reference flakes and the new flakes. Table 4 shows the values of RAI for conventional flakes, as well as for flakes made according to processes of the present invention.

TABLE 4

Relative Absorbance Index Values for Potato Flakes produced with different methods.

| | RAI | Actual Absorbance @ 265 nm |
|---|---|---|
| Conventional Potato Flakes | 2.1 | 0.0882 |
| Reduced Cooking, Co-flaking (wheat starch) and Infrared/Drum drying | 1.26 | 0.053 |
| Infrared/Drum drying | 1.02 | 0.043 |
| Co-flaking (wheat starch) | 1 | 0.042 |

FIRMNESS OF POTATO MASH (COOKED POTATOES)

The firmness of the potato mash is defined as the force needed to back extrude the cooked potatoes from the top of the container down to 75% of the volume of the container. This is an indirect measurement of the viscosity of the cooked potatoes. The firmness of potato mash can be affected not only by the potato variety, potato solids, and age/storage conditions, but also by the process conditions such as residence time and pressure in the cooker, and also by the co-flaking materials added to the mash.

The firmness (among other rheological parameters) of the cooked potatoes can influence the drum drying operation. The firmness of potato increases as the cooking time is decreased, which may be due to the limited softening of the cellulosic material and/or partial hydrolysis of protopectin and partial starch gelatinization. Normally, in conventional drum drying operation, it is difficult to process relatively firm pieces of potatoes into a dehydrated potato flakes without causing operational problems. For instance, it can be difficult to evenly distribute relatively firm potato material on the drum with the applicator rolls. Also, the relatively raw, firm potato pieces can fail to stick to the drum surface, and fall to the applicator rolls positioned at the bottom of the drum dryer. This can result in uneven distribution of cooked potatoes on the surface of the drum, which reduces the production rate significantly.

According to the present invention, the potatoes can be subjected to reduced cooking (and so are relatively firm), followed by application of a co-flaking agent such as wheat starch to the relatively firm potatoes. The addition of the co-flaking agent decreases the firmness of the potato mash. For instance, the addition of 10% wheat starch can provide a reduction in firmness of the potato mash of about 50%, from about 1,800 gf to about 860 gf (measured using a 35 mm compression disk; when a 45 mm disk is used, the measured firmness value drops from about 12,400 to about 7,434 gf). Accordingly, reduced firmness of the potato mash can be obtained, while avoiding the disadvantages of overcooking or uneven cooking of the potato material. According to the present invention, potato material can be subjected to reduced cooking in combination with wheat starch addition to provide a potato mash having a firmness from about 700 gf to 1800 gf, more particularly from about 800 gf to about 1200 gf (measured using a 35 mm compression disk; when a 45 mm disk is used, the measured firmness value is from about 5,000 gf to about 16,000 gf).

Sheet Thickness

Sheet thickness is a function not only of drum speed, drum dryer steam pressure, cooking time, and potato solids, but also the presence of other materials added to the mash. Addition of 15% wheat starch can provide a strong influence on the thickness of the sheet coming out of the drum dryer. Addition of Infrared heating to the outer surface of the mashed potatoes on the drum can also reduce the sheet thickness, especially at higher IR panel temperatures, by reducing the residence time of the sheet on the drum for a target moisture content. According to the methods of the present invention, the sheet thickness on the drum is from about 0.005 to about 0.02 inches.

VITAMIN C

Potatoes are a rich source of Vitamin C, and can include two types of Vitamin C: L-ascorbic acid, and dehydroascorbic acid. The total amount of the two acids in potato tubers ranges from 1 to 54 mg/100 g, most frequently from about 10 to 25 mg/100 g.

The level of vitamin C present in the potato flakes is dependent on the level of vitamin C present in the fresh potato, which depends on potato variety, growing conditions and storage conditions. Vitamin C retention in the potato flakes is also affected by the process conditions (peeling, cooking, drying grinding), the final moisture content of the dehydrated potato flakes, and storage conditions until utilized as raw materials for another product.

The potato flakes produced by the processes of the present invention retain more vitamin C from the fresh potato when compared to potato flakes produced by conventional methods. This is believed to be due to the decrease in cooking time and decrease in residence time during drum drying. The dehydrated potato flakes prepared according to the present invention can have from about 3 mg vitamin C/100 mg potato solids to about 30 mg vitamin C/100 mg potato solids. The dehydrated potato flakes according to the present invention can have an Average Vitamin C Retention Rate of at least about 7%, and in one embodiment at least about 15%, relative to the Vitamin C initially present in the potato material from which the potato flakes are formed. The Average Vitamin: C Retention Rate is determined by averaging the percent retention of Vitamin C for three or more samples of dehydrated flakes. The percent retention (% retention) is 100 times the ratio of the amount of Vitamin C (mg/100 grams potato solids) in the dehydrated flake sample to the amount of Vitamin C in the raw potato from which the flakes are made.

FIG. 10 shows the Vitamin C concentration of potato flakes as a function of cooking time. Table 4 shows the level of Vitamin C for raw potato material (32 mg/100 gram) as well as the % Retention for dehydrated flakes made by three different processes: 1) conventional processing with drum drying; 2) processing wherein the potato mash is dried using a combination of Infrared drying and drum drying according to the present invention wherein; and 3) processing wherein the potato material is subjected to reduced cooking according to the present invention, followed by drying using a combination of infrared drying and drum drying according to the present invention. Referring to Table 4, the Average Vitamin C Retention Rate for the conventionally dried flakes is 4.8 percent based on 7 samples (n=7); the Average for the IR dried flakes based 3 samples is 15.9%, and the Average for the reduced cooking and IR dried flakes based on 5 samples is 15 7.9%.

TABLE 4

VITAMIN C RETENTION (%)

|  | Vitamin C (mg/100 g solids) | % Retention |
|---|---|---|
| Raw potatoes |  |  |
| Russet Burbank | 3–32 |  |
| Dehydrated Potato Flakes |  |  |
| 1. Conventional | n = 7  0.9–4.2 | 3–12.5 |
|  | avg = 1.54 | avg = 4.8 |
| 2. Whole potatoes boiled in water and dried with IR/drum | n = 3  2.0–8.9 | 6–28 |
|  | avg = 5.1 | avg = 15.9 |
| 3. Reduced cooking with steam and dried with IR/drum | n = 5  0.9–6 | 3–19 |
|  | avg = 2.53 | avg = 7.9 |

AMINO ACID CONTENT

The cooking and drying steps of potato processing generally results in significant thermal and mechanical stress to which the potatoes are subjected. One way to indirectly determine the level of quality deterioration is by measuring changes in composition. When amino acids participate in the Maillard browning reaction, the amino acids are lost from a nutritional standpoint. This is particularly important for Lysine and basic amino acids such as L-arginine, and L-histidine. Normally, if a food has undergone Maillard browning, some loss of amino acids and nutritive value has occurred. Another pathway that involves loss of essential amino acids is known as the Strecker degradation, which involves the interaction of α-dicarbonyl compounds and α-amino acids. Volatile compounds formed during the Strecker degradation reaction include aldehydes, pyrazines, and sugar fragmentation, which contributes to flavor and aroma of both the dehydrated product and the finished fried product.

The dehydrated potato flakes of the present invention can exhibit higher total levels of most amino acids compared to flakes made by conventional processes. Table 5 compares the total amino acid composition of dehydrated potato flakes made according to the present invention (test flakes) with the total amino acid composition of a reference sample made by conventional processes.

TABLE 5

Comparison of Total Amino Acid Content

|  | REFERENCE FLAKES Example A | TEST FLAKES: Example A | REFERENCE FLAKES Example B | TEST FLAKES: EXAMPLE B |
|---|---|---|---|---|
| PEELING | full peel | full peel | full peel | no peeling |
| SLICE THICKNESS | ½ inch | ½ inch | ½ inch | whole potato |
| COOKING MEDIUM | steam | steam | steam | water |
| COOK TIME (minutes) | 45 | 45 | 35 | 25 |
| INFRARED TEMP. (F.) | N/A | 360 | N/A | 950 |
| INFRARED COVERAGE | N/A | 11% of drum surface | N/A | 11% of drum surface |

TABLE 5-continued

Comparison of Total Amino Acid Content

| | REFERENCE FLAKES Example A | TEST FLAKES: Example A | REFERENCE FLAKES Example B | TEST FLAKES: EXAMPLE B |
|---|---|---|---|---|
| TOTAL AMINO ACIDS (mg/100 g solids) | | | | |
| Aspartic Acid | 2648 | 2600 | 2511 | 2923 |
| Threonine | 264 | 278 | 285 | 299 |
| Serine | 319 | 311 | 316 | 334 |
| Glutamic Acid | 1714 | 1700 | 1888 | 2451 |
| Proline | 264 | 267 | 253 | 311 |
| Glycine | 209 | 211 | 243 | 265 |
| Alanine | 242 | 244 | 285 | 299 |
| Cystine | 88 | 100 | 105 | 115 |
| Valine | 429 | 444 | 527 | 621 |
| Methionine | 110 | 111 | 148 | 161 |
| Isoleucine | 231 | 256 | 316 | 357 |
| Leucine | 385 | 400 | 422 | 449 |
| Tyrosine | 242 | 311 | 253 | 345 |
| Phenylalanine | 330 | 356 | 380 | 403 |
| Histidine | 165 | 200 | 211 | 242 |
| Lysine | 484 | 500 | 517 | 587 |
| Arginine | 473 | 500 | 475 | 541 |
| Tryptophan | 88 | 89 | 105 | 104 |

In Table 5, the Reference and Test flakes listed as Example A where made from the potatoes selected from the same lot. Likewise, the flakes listed as Example B where made from potatoes selected from the same lot.

Free Amino Acid Content

More than two-thirds of the non-protein nitrogen in potatoes is present as free amino acids. Aspartic acid, glutamic acid and valine comprise more than 50% of the total content of free amino acids. Free amino acids levels in potatoes vary depending on potato variety and environmental conditions, and later process conditions. Free amino acids (i.e. glutamic acid, methionine, leucine, isoleucine, etc) affect the flavor and quality of the dehydrated product. For example Tyrosine, is oxidized by the polyphenolic oxidase changing its color causing darkening of potato flesh. Tyrosine's products of oxidation (melanins) are responsible for discoloration of potatoes.

These free amino acids can react with reducing sugars resulting in flavor reactions. Some of the reactions result in positive flavor while others are responsible for processed (e.g., undesirable) flavors.

Without being limited by theory, it is believed that the higher levels of free amino acids in flakes made by the present invention as compared to those of conventional processes, indicates a lower rate of degradation reactions (Strecker Aldehyde reaction) in the processing of the present invention, and this lower rate is thought to be due to the reduction in residence time in cooking and drying according to the present invention. Addition of specific amino acids such as methionine to the potato mash will increase the leavel of free methionine, so that higher potato flavor intensity can be perceived in the fabricated chips after frying.

Heat Generated Volatiles

Potato tubers contain many volatile compounds; aldehydes, alcohols, esters, organic sulphur compounds and others. Raw potatoes contain acetaldehyde, propionaldehyde, butyraldehyde, methanol, ethanol, 1-propanol, 2-propanol, 1-butanol, pentanol, octanol, acetone, butanone, heptanone, esters of fatty acids, and other heat generated volatiles. The potato flakes produced by the practice of the present invention have substantially less heat generated volatile compounds than conventional flakes. Gas chromatography and mass spectrometry can be used to compare conventionally produced flakes and flakes produced by the methods of the present invention.

The flakes of the present invention exhibit especially low levels, or none, of the following compounds: methylbutanals, dimethyldisulfide, dimethyltrisulfide, methional, phenylacetaldehyde, and ethyl pyrazine. These compounds are responsible for some of the browning flavor reactions resulting from processing. This composition differences observed in the flakes of the present invention can be described by the concept of "smoking gun". The concept of "smoking gun" relates to the composition of the volatiles in the flakes, which is a indirect measurement of the concentration of the initial flavor precursors in the potatoes, as well as the indirect measurement of the loss of precursors due to the severity of the process as well as the degree of browning reactions occurring in the process. The lower the volatile composition in the flakes, the higher the flavor composition for the finished product or snack.

Table 6, below, summarizes the relative levels of flavor compounds, in terms of Reduction Ratio, for conventional flakes and for potato flakes of this invention using a modified purge and trap technique with gas chromatography and mass spectrometry. Table 6 demonstrates that the potato flakes of this invention have a reduction in these processed flavor compounds as compared to those in conventional flakes. The flakes of the present invention have a Reduction Ratio of greater than about 2, preferably from about 2 to about 40, more preferably from about 2 to about 10, for the compounds 3-Methyl-Butanal, 2-Methyl-Butanal, Di-Methyl-Disulfide, Di-Methyl-Trisulfide, Methional, and Phenylacetaldehyde; and greater than about 2, preferably from about 2 to about 50, and more preferably from about 2 to about 20, for Ethyl Pyrazine. Mashed potatoes prepared with the flakes of the present invention showed cleaner and more potato flavor than conventional flakes.

In Table 6, Sample Q refers to flakes according to the present invention made by cooking ¼ inch partially peeled potato slices in steam for 15 minutes, adding 10% wheat starch to the potato mash, and drying with infrared heat (360° F.) in combination with drum drying.

Sample BB refers to flakes according to the present invention made by cooking whole unpeeled potatoes in boiling water for 25 minutes, no addition of wheat starch, and drying with infrared heat (950° Fahrenheit) in combination with drum drying.

Sample V refers to flakes according to the present invention made by cooking peeled ½ inch potato slices with steam for 40 minutes, no addition of wheat starch, and drying with infrared heat (950° F.) in combination with drum drying.

TABLE 6

Reduction Ratios for Samples Q, BB, and V - Comparison of Relative Levels of Selected Volatile Flavor Compounds in Dehydrated Potato Products (reduction relative to conventional processed products, calculated as the ratio of the peak areas of the flavor compound for the selected ion in the conventional product to the products of the invention; this the "Reduction Ratio")

| Flavor Compounds | m/e ion | Sample Q | Sample BB | Sample V | Conventional Flakes |
|---|---|---|---|---|---|
| 3-Methyl-Butanal | 71 | 18.2 | 16.3 | 5.7 | 1 |
| 2-Methyl-Butanal | 86 | 22.6 | 14.6 | 6.1 | 1 |
| Di-Methyl-Disulfide | 94 | 13.1 | 12.5 | 4.7 | 1 |
| Di-Methyl-Trisulfide | 126 | 10.3 | 10.5 | 5.2 | 1 |
| Methional | 104 | 19.9 | 13.0 | 5.4 | 1 |
| Phenylacetaldehyde | 91 | 10.5 | 12.8 | 4.0 | 1 |
| Ethyl Pyrazine | 107 | 41.4 | 17.0 | 10.9 | 1 |

Table 7 presents quantitative analysis of heat generated volatiles for conventional flakes and for sample Q' of the present invention. Sample Q' refers to flakes equivalent to those of sample Q above, but from a different lot. The flakes of the present invention can comprise up to about 0.3 ppm, preferably from about 0.1 to about 0.3 ppm, of 2-methylpyrazine. The flakes of the present invention can also comprise less than about 0.12 ppm, preferably less than about 0.06, and more preferably less than about 0.04 ppm 2,5-dimethylpyrazine; and up to about 2.7 ppm, preferably up to about 1.5 ppm, and more preferably up to about 0.6 ppm of phenylacetaldehyde. The flakes of the present invention can also comprise up to about 0.3 ppm, preferably from about 0.1 to about 0.3 ppm, of methional.

TABLE 7

Quantitative analysis (concentration ppm) of volatile compounds of Reference Potato Flakes and New Flakes.

| Volatile Compounds | Conventional Flakes (ppm) | Q' Flakes (ppm) |
|---|---|---|
| 2-methylpyrazine | 0.32 | 0 |
| 2,5-dimethylpyrazine | 0.14 | 0 |
| 3-ethyl 2,5-dimethylpyrazine | 0.05 | 0 |
| Phenylacetaldehyde | 2.73 | 0.64 |
| Methional | 0.7 | 0.32 |

SHEET STRENGTH

Sheet strength is a measurement of sheetability of dough. The higher the sheet strength, the more cohesive and elastic the dough is. Dough compositions containing potato flakes, and which are made with the addition of wheat starch according to the present invention, exhibit substantially improved sheet strength as compared to doughs made with conventional potato granules. The sheet strength is a measurement of the force needed to break a piece of dough. The sheet strength correlates with cohesiveness of the dough and the ability of the dough to resist developing holes and/or tearing during subsequent processing steps.

The sheet strength of the doughs of the present invention increases as the amount of energy input during the dough-making step increases. Factors which can affect energy input include, but are not limited to, mixing conditions, dough sheet formation, and the amount of measurable free amylose. Potato flakes from this invention produced with reduced cooking and/or infrared heating showed lower sheet strength due to the lower level of free amylose, and less cell breakage. By adding wheat starch to the potato mash in accordance with the present invention, the level of free amylose is increased. The combination of reduced cooking, wheat starch addition, and infrared drying in combination with drum drying provides a dough which is both sheetable and which does not exhibit excessive cell breakage. Doughs made from flakes of the present invention have a sheet strength from about 80 gf to about 450 gf, preferably from about 110 gf to about 240 gf, and more preferably from about 140 gf to about 220 gf.

DOUGH PREPARATION

The dough compositions of the present invention can be prepared by any suitable method for forming sheetable doughs. Typically, a loose, dry dough is prepared by thoroughly mixing together the flakes, flanules, or granules, and other starch-based materials and optionally an emulsifier and sucrose fatty acid polyester combination. A water pre-blend of flavoring (optional), hydrolyzed starches, sucrose and/or salt are separately mixed to obtain the previously defined hydrolyzed starch and water levels. The water pre-blend is then added to the starch-based material mixture and emulsifier blend. Preferred devices for mixing together the dough ingredients are conventional mixers. Hobart® mixers are used for batch operations and Turbolizer® mixers can be used for continuous mixing operations. However, extruders can also be used to mix the dough and to form the sheets or shaped pieces.

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should be heated to from about 90° F. (32° C.) to about 135° F. (57° C.). In a preferred embodiment, the mill rolls are kept at two different temperatures, with the front roller being cooler than the back roller. The dough can also be prepared by extrusion.

Dough compositions of the present invention are usually formed into a sheet having a thickness of from about 0.015 to about 0.10 inches (from about 0.038 to about 0.25 cm), and preferably to a thickness of from about 0.05 to about 0.10 inches (from about 0.013 to about 0.025 cm), and most preferably from about 0.065 inches to about 0.080 inches (1.65 to 2.03 mm). For rippled (wavy shaped) chips, the preferred thickness is about 0.75 inches (1.9 mm). The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described in published PCT application WO 95/07610, Dawes et al., Jan. 25, 1996, which is incorporated by reference. U.S. Pat. No. 5,464,642 issued Nov. 7, 1995 in the name of Villagran et al. discloses a process for making reduced fat fried snacks, and is incorporated herein by reference. After the snack pieces are formed, they are cooked until crisp.

In accordance with the present invention, the dough preparation may include further addition of wheat starch, corn meal, rice, modified starches, or combinations thereof. Doughs made with flakes of the present invention may not require as much emulsifier and water as is typically required to form a cohesive sheet for fabricated snacks. This is due to the reduction in cell damage, lower WAI, and lower degradation of phospholipids (a natural emulsifier) normally found in the cell wall.

PEAK VISCOSITY (PV)

The rate and degree of swelling and breakdown of starch is characteristic of the starch source, and is affected by processing, other components and modification. Peak viscosity correlates to the water absorption index or hydration and binding capacity of the starch or mixture. It is often also correlated with final product quality, and provides and indication of the viscous load likely to be encountered by a mixing cooker or extruder. During the paste viscosity measurements the sample is heated to 95 degrees Centigrade and held at that temperature for 10 minutes, after which it is allowed to cool to room temperature. During the hold period the sample is subjected to a high temperature and mechanical shear stress. This disrupts the starch granules and amylose leaches out into solution. This period is characterized by a reduction in viscosity, sometimes called hot paste viscosity. As the sample is cooled, reassociation between starch molecules occurs to a greater or lesser degree. This phase is commonly referred to as the setback and involves retrogradation, or reordering of the starch molecules. The degree of starch retrogradation relates to the final viscosity.

Paste viscosity (peak and final) can be measured on flakes containing wheat starch, and such flakes can exhibit a significantly different viscosity than that of flakes made conventionally. Potato and cereal starches behave in quite different ways on cooling due to the formation of strong gels, whereas the potato starch pastes were practically unaffected by cooling for long periods of time. Potato flakes made without wheat starch have relatively lower viscosity, due to quick destruction of the granules after complete gelatinization and shearing of the granules. Flakes made with wheat starch have relatively higher viscosities due to the formation of gels as the result of fragmented amylopectin. The gelation of amylose in the potato starches is probably hindered because of insufficient separation from the amylopectin and insufficient space for the amylose to mobilize.

The potato flakes of the present invention have a peak viscosity (PV) in the range of about 50 RVA units to about 400 RVA units, preferably from about 85 RVA units to about 400 RVA units, more preferably from about 115 RVA units to about 300 RVA units, and still more preferably from about 121 RVA units to about 158 RVA units and a final viscosity in the range of about 40 RVA units to about 200 RVA units, preferably from about 60 RVA units to about 155 RVA units, more preferably from about 90 RVA units to about 120 RVA units, and still more preferably from about 95 RVA units to about 110 RVA units.

DEGREE OF GELATINIZATION

The degree of cooking of the potato material can be measured in two ways: indirectly by measuring the water absorption index, and directly by measuring the energy needed to gelatinize any ungelatinized starch fraction in the sample. This energy to gelatinize is measured with a Differential Scanning Calorimeter, (TA Instruments, Corp., New Castle, Del.) by determining the Enthalpy of gelatinization ($\Delta H_g$) of the starch containing samples. The $\Delta H_g$ is measured as the area under the peak from a thermograph of Energy ($\Delta H$) vs temperature. Any fraction of ungelatinized starch in the flakes will gelatinize at a temperature range from 58 to 70° C. The degree of gelatinization is calculated as:

$$100\% - [(100) \times (\Delta H_g \text{ of the flakes})/(\Delta H_g \text{ of raw potatoes})]$$

Figure 12A:
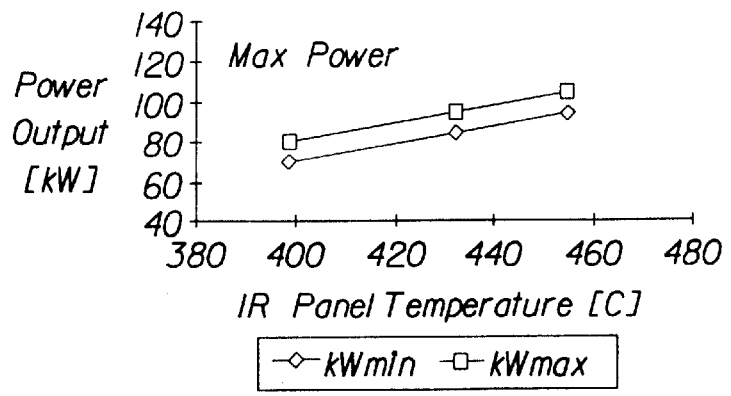
FIG. 12A. Graphical illustration of IR Panel Power v. Temperature.

The potato flakes of the present invention comprise a partial degree of gelatinization of starch of less than 100%. For flakes of the present invention made with reduced cooking and with the addition of wheat starch to the potato mash the degree of gelatinization is about 75 percent. FIG. 12 shows the thermogram for the raw potato, as well as the sliced potatoes cooked for a minimum time of 12 min with steam.

VISCO-ELASTIC PROPERTIES OF FLAKES IN A DOUGH SYSTEM

Typical steady shear measurements are not feasible for the doughs which are generally non-flowable. An excellent alternative method for this material is oscillatory testing. Since the doughs are relatively non-flowable an oscillatory test method is used. The visco-elastic properties of the dough can be measured using a Control Stress Rheometer. The visco-elastic property G' (elastic modulus) relates to the elasticity of the dough while G" (viscous modulus) relates to the fluidity of the dough. When a dough sheet containing flakes (made by the methods of this invention) has high rigidity or elastic modulus, the internal structure of the snack is highly expanded. This expanded structure results in a fried snack that has a foamy (Styrofoam-like) texture and a slow mouth-melt. The G' measurement is an indication of how well the doughs will tolerate stress and also the type of internal structure that will be present in the snack after frying.

Doughs made with the potato flakes produced by the process of the present invention can have a G' of from about 15000 Pascals to about 90000 Pascals, preferably from about 35000 Pascals to about 55000 Pascals. The G" of the doughs can be from about 3000 Pascals to about 15000 Pascals, preferably from about 5000 to about 10000 Pascals.

ANALYTICAL METHODS

Water Absorption Index (WAI)

In general, the terms "Water Absorption Index" and "WAI" refer to the measurement of the water-holding capacity of any carbohydrate based material as a result of a cooking process. (See for example Anderson, R. A., Conway, H. F., Pfeifer, V. F. and Griffin, Jr., E. L., 1969, Gelatinization of Corn Grits By Roll- and Extrusion-Cooking. *CEREAL SCIENCE TODAY*; 14(1):4). The cooking and dehydration of potato flakes and granules introduce changes in the potato cell physiology that affects its rehydration properties, specifically its water-holding capacity. This measurement is typically expressed as the ratio of mass of water held per unit mass of material.

The WAI for a sample is determined by the following procedure: The weight to two decimal places of an empty centrifuge tube is determined. Two grams of dry sample (e.g., potato flakes) are placed into the tube. Thirty milliliters of water is added to the tube. The water and sample are stirred vigorously to insure no dry lumps remain. The tube is placed in a 30° C. (85° F.) water bath for 30 minutes, repeating the stirring procedure at 10 and 20 minutes. The tube is then centrifuged for 15 minutes at 3,000 RPM. The water is then decanted from the tube, leaving a gel behind. The tube and contents are weighed. The WAI is calculated by dividing the weight of the resulting gel by the weight of the dry sample (i.e., [weight of tube and gel]−[weight of tube]÷[weight of dry flakes]).

Percent Amylose (A %) Test

This method is designed to measure the percentage (relative quantity) of amylose in potato flakes and granules which is soluble in 0.1N NaOH solution under specific test conditions. The flakes or granules are stirred in the base solution at 60° C. for 30 minutes, centrifuged, and the clear supernatant is then reacted with iodine and analyzed spectrophotometrically. The amylose is measured as the iodine complexes at 700 nm, rather than 610 nm, to avoid the interference from the "amylose-$I_2$ complex".

Apparatus

Volumetric flasks, volumetric pipettes, balance, spectrophotometer (Beckman Model 24 or equivalent), cells (1 cm disposable, Marksman Science #1-P-10, or 1 cam sipper type Markson MB-178 or Beckman Part #579215), constant temperature bath, blender and blender jars.

Reagents

Sodium Hydroxide Solution 0.1N, Hydrochloric Acid, Iodine, Potassium Iodide, Reference Flakes.

Preparation of Solutions

A. Stock Iodine Solution

Weigh 2 g of Iodine and 20 g of Potassium Iodide into a red 250 ml volumetric flask, and dissolve with distilled water.

B. Reagent Iodine Solution

Pipet 10 ml of the stock Iodine solution and 2 ml of concentrated hydrochloric acid into a red 1000 ml volumetric flask. Dilute to volume with distilled water.

Reference Flakes:

Reference flakes are potato flakes having a WAI of 8.5, moisture content of 7 percent by weight, density of 35 lb/cubic ft., particle size distribution such that a maximum of 30% by weight pass through a 40 mesh screen to provide a free amylose level of 24%.

Standard Curve Preparation Using Reference Flakes

1. Dissolve 1 g of reference flakes with 100 mL of 0.1N NaOH. Transfer entire solution into a centrifuge bottle, without rinsing. Centrifuge at 2300 rpm for 15 min.
2. Prepare three dilutions: a) 10 ml of supernatant into 100 ml of 0.1N NaOH, b) 5 ml of supernatant of first dilution into 100 ml of 0.1N NaOH, and c) 50 ml of the second dilution into 100 ml of 0.1N NaOH.

Sample Preparation

1. Obtain percent moisture in each sample. (Vacuum oven 16 hours 70° C. or 3 hr @130° C. in an air oven).
2. Weigh 0.2 g of potato flakes or granules and dissolve with 100 ml of 0.1 N NaOH solution. Turn the stirrer on high to obtain a good vortex in the liquid.
3. Place samples in the 60° C. water bath. Stir for 30 minutes. Remove from bath.
4. Pour the entire solution into a centrifuge bottle; do not rinse. Centrifuge at 2300 rpm for 15 minutes.
5. Pipet 1 ml of the supernatant into a 25 ml volumetric flask. Dilute all the volume with iodine reagent. Prepare the blank solution, using 1 ml of the 0.1N NaOH solution in a 25 ml flask. Shake well. The colorimetric determination must be made 10–30 minutes after mixing.

Colorimetric Determination

Set the wavelength to 700 nm. Zero the instrument with distilled water in the sample cell and in the reference beam. Fill the sample cell with blank solution and read against distilled water. Note this value and subtract from each sample value. The absorbencies fall between 0.02 and 0.8 absorbance units.

Calculations (Using the Standard Amylose):

Plot a curve using g/100 ml of standard concentrations as the x-axis versus the absorbance @700 nm as the y-axis, and determine y intercept and slope.

$$(\text{amylose g}/100 \text{ ml}) = \frac{[\text{abs of sample @ 700 Nm} - \text{abs of blank @ 700 Nm} - \text{Yintercept}]}{\text{slope}}$$

$$\% \text{ Free Amylose} = \frac{\frac{(\text{Amylose g}/100 \text{ ml}) \times (100) \times 0.31}{(100 - \% \text{ water}) \times (\text{Sample wt.})}}{100}$$

The "0.31" is a correction factor for the amylose content for the reference flakes.

Vitamin C Measurement

Vitamin C is measured according to AOAC International Official Methods of Analysis (1955), 16th Edition, Method 45.1.14, AOAC, Arlington, Va., (modified). The method can be found in the Journal of Biological Chemistry, Volume 147, pg. 399 (1943), (modified) herein incorporated by reference. This method measures total Vitamin C and cannot differentiate between ascorbic and erythorbic acid.

Simultaneous Distillation, Extraction and GC Analysis for Volatile Compounds

Volatile compounds are measured according to the following methods:

(1) Schultz, T. H., Fath, R. A., Mon, T. R., Eggling, S. B., and Teranishi, R. "Isolation of Volatile Compounds" *J. Agric. Food Chem.*, Vol. 25, No. 3, May–June (1977) pp. 446–449.

(2) Likens, S. T., Nickerson, G. B. *Proc. Am. Soc. Brew. Chem.* 5 (1964)

This procedure has been applied to recovering volatiles (e.g., 2,5-dimethyl pyrazine and 2,4-decadienal) from French fries. This procedure is applicable to other food components and finished products as long as the desired analyte is steam distillable.[1][2]

As the sample is steam distilled at atmospheric pressure the steam distillate and methylene chloride vapors are co-mingled then co-condensed. After liquid phase separation occurs in the extractor u-tube, the lighter aqueous phase returns to the sample flask and the heavier methylene chloride phase returns to the analyte concentration flask. When distillation/extraction is complete the methylene chloride is gently blown down and a portion of this concentrate is analyzed further by capillary GC/FID. An internal standard is added to the sample at the onset of the method to track analyte recovery.

| Apparatus | |
|---|---|
| Gas Chromatograph | Hewlett Packard 5890 equipped with flame ionization detector (FID) and 3396 integrator |
| Autosampler (optional) | Hewlett Packard 7673A |
| Capillary Column | Stabilwax 30 m, 0.32 mm ID, 0.25 umdf |
| Autosampler Vials (with inserts) | Kimble EKONICAL 60745-1232 (Kimble 60820-1232 with 66009-996 inserts) |
| Balance | Top loading, two place, four place |
| Support Jacks (2) | VWR 60142-546 |
| Hot plate/stirrer (3) | Corning 6795-220 |
| Circulating Bath/cooler | Lauda RM3 |
| 250 mL Flat Bottom Round Flask | Pyrex 4100-250 |
| 2000 mL Flat Bottom Round Flask | Kontes 601000-0829 |
| Reducing Adapter 24/40-29/42 | Pyrex 8825-2924 |
| Size 24 Stopper | Kimble 4189OR-2440 |
| 50 mL, 100 mL and 1000 mL Graduated Cylinder | Pyrex 24710-102,124 Kimax 34795-062 |
| 1 mL Reacti Vial | Accuform Kimble 60700-1 |
| Scintillation Vials | VWR 66022-081 |
| Pasteur Pipets | VWR 14672-200 |
| Syringe (2) | Hamilton 100 ul |
| Volumetrics | Kimax 28014-100 |
| SDE Glassware | Kontes 523010-0000, 52301, 523012 |
| Boiling Stones | VWR 26397-409 |
| Stir Bar 76.2 × 12.7 mm | VWR 58948-193 |
| Support Base | VWR 60110-266 |
| 3 Prong Clamp | VWR 21570-404 |
| Pie Plate (2) | |

*Equivalent equipment may be substituted for that recommended above

| Reagents | |
|---|---|
| Tetramethylpyrazine (TMP) | Aldrich 18,393-8 |
| Methylene Chloride | B&J 300-4 |
| Acetone | B&J 010-4 |
| Antifreeze | |
| Deionized water | Milli-Q |
| Dry Ice Pellets | |
| N2 | |

Operation
A. Internal Standard(s) Preparation
1. Tetramethylpyrazine (TMP)
Weigh 0.10 g±0.001 TMP into a 100 mL volumetric flask. Add fresh deionized distilled water to volume. Label flask. Add 50 ul of this standard to the 2000 ml sample flask when performing extraction.
B. Distillation and Extraction Procedure
1. Circulation bath/cooler
   a. Place coolant (1:1 antifreeze:$H_2O$) in cooler chamber. Fill to above cooling coil.
   b. Set cooling dial to 0 C.
2. Distillation and Extraction
   a. Place SDE condenser insert into main chamber making sure inlet glass tube is to the right. Shut stopcock at the bottom of apparatus.
   b. Place SDE apparatus into three prong clamp. Connect tubing to that cooler. Turn on cooler.
   c. Place dry ice and approx. one inch of acetone into top condenser piece. Place top condenser piece onto assembly (may have to add dry ice throughout extraction.)
   d. Place 100 mL Methylene Chloride (measured from a 100 mL graduated cylinder) and one boiling stone into the 250 mL flat bottom round flask. Join flask to right side of condenser. Place pie pan on hot plate on support jack. Add approx. 1 liter distilled $H_2O$ to pie plate and adjust support jack upwards until flask is secure to apparatus. Turn hot plate to heat setting "4" (60° C.).
   e. Place stir bar and 700 mL of fresh, deionized distilled water into the 2000 mL flask. Add sample to be extracted according to the following table:

| Sample type | Weight |
|---|---|
| flakes | 50.0 ± 0.1 g |

Add 50 ul of 0.1% TMP internal standard to flask.
   f. When enough $MeCl_2$ has boiled to fill loop of condenser, attach the large flask to left side of condenser using the 24/40-29/42 reducer. Raise 2nd hot plate on jack until flask is secure. Turn hot plate heat setting to above "6" (a setting adequate to generate rapid boiling without foaming) then turn the stir setting to full.
   g. Place insulating sleeve on left arm of condenser and paper towel around stopcock (if needed to catch condensation).
   h. Allow sample flask to come to a boil (approx. 20 minutes from starting to heat.) Time the extraction/distillation for 90 minutes.
   i. After 90 minutes turn off the heat on both hot plates. Lower right hot plate with water pan, rest bottom of flask on edge of pan. Allow condensation to stop and $MeCl_2$ flask to cool (approx. 15 minutes).
   j. When $MeCl_2$ has cooled, remove the 250 mL flask from right side and add the $MeCl_2$ still in loop of condenser to the flask via the stopcock. Place glass stopper in 250 mL flask and store in explosion-proof freezer until ready to concentrate (Section 3).
   k. Using hot mitts (caution, sample flask will still be hot) lower and remove 2000 mL flask.
   l. Turn off cooler. Disconnect top (inlet) hose and allow as much coolant to drain back into cooling chamber as possible. Carefully disconnect bottom (outlet) hose. Drain any remaining coolant into cooling chamber.
   m. Set condenser pieces aside to wash (section 4).
3. Sample Extract Concentration
Extract may be stored either before step "a" or after step "d" in explosion-proof freezer indefinitely. If storing extract after step "h", $MeCl_2$ may evaporate and volume may need to be adjusted before further analysis
   a. Set up the third hot plate with second pie pan containing distilled $H_2O$ in fume hood equipped with $N_2$ line.
   b. Heat water in pan on setting "3" (60° C.).
   c. Place 250 mL sample flask (Section 2,j) into water and concentrate $MeCl_2$ to 40 mL under gentle stream $N_2$.
   d. Transfer 20 ml of concentrate to a 20 ml scintillation vial and place vial in hot water bath on hot plate and concentrate the $MeCl_2$ under $N_2$ until approx. 2 ml remain. Hold or clamp vial so it does not float or become contaminated by $H_2O$ during concentration.
   e. Remove scintillation vial from $H_2O$ and replace with a 1 ml Reacti vial. Add 1 ml of concentrate from step (d) to reacti vial using a Pasteur pipette. Transfer MeCl$_2$ carefully, it will drip from pipette tip.

f As MeCl$_2$ blows down, continue to add sample concentrate until all has been transferred from scintillation vial. Rinse scintillation vial with appox. 1 mL of fresh MeCl$_2$ and transfer this rinse to reacti vial.

g Continue to concentrate MeCl$_2$ until 100 ul remains. Take extreme care to not allow the extract to evaporate to dryness. Transfer the 100 ul (via a syringe to a GC vial (with insert). Cap GC Vial.

C. GC Analysis

1. Set up Instrument conditions as per Table I and integrator and sequence as per Table II.
2. To light FID detector open H$_2$ and compressed air at tanks. Open valves on GC, detector 2. Press FID) button, listen for "pop". Open auxiliary gas valve.
3. Fill two large vials (for syringe rinse on auto sampler) and one GC vial with MeCl$_2$.
4. The first run each day is a MeCl$_2$ wash. Place MeCl$_2$ containing GC vial in position "1" on autosampler.
5. To analyze sample replace MeCl$_2$ vial with the vial prepared in step "g" of sample extract concentration.
6. If using inserts in vials and no solvent peak appears on run; hit ABORT to stop run, re-center insert ad replace vial seal and perform step "5" again.
7. After last GC analysis allow oven to cool to 40° C. Turn off aux gas. H$_2$ and air valves on instrument and turn H$_2$ and air gauges on tanks to closed.

D. Calculation Method

To calculate the amount (ppm) of analyte per sample, use the following calculation:

$$\frac{(\text{Area of Analyte}) \times (\text{weight of Internal Standard (grams)}) \times (1 \text{ ppm})}{(\text{Area of Internal Std}) \times (\text{weight of sample (grams)}) \times (10^{-6})}$$

EXAMPLE $$\frac{(503191 \text{ area units}) \times (5.0 \times 10^{-5} \text{ grams}) \times (1 \text{ ppm})}{(1667783 \text{ area units istd}) \times (50 \text{ grams}) \times (10-6)} = 0.30 \text{ ppm analyte}$$

Flavor Analysis Using a Modified Purge and Trap Technique With Gas Chromatography and Mass Spectrometry

REFERENCES

1. D. D. Roberts and T. E. Acree, "Simulation of Retronasal Aroma Using a Modified Headspace Technique" Investigating the effects of Saliva, Temperature, Shearing, and Oil on Flavor Release", J. Agric. Food Chem. 1995, 43, 2179–2186.
2. S. Maeno and P. A. Rodriguez, "Simple and versatile injection system for capillary gas chromatographic columns Performance evaluation of a system including mass spectrometric and light-pipe Fourier-transform infrared detection", J. Chromatogr. A 1996, 731, 201–215.
3. P. A. Rodriguez, R. Takigiku, L. D. Lehman-McKeeman, M. Fey, C. L. Eddy and D. Caudill, J. Chromatogr. A 1991, 563, 271.
4. G. I. Roth and R. Calmes, Oral Biology; C. V. Mosby: St. Louis, Mont., 1981.

A retronasal aroma simulator (RAS) (ref. 1) that incorporates synthetic saliva addition, regulated shearing, gas flow, and temperature is used to generate the aromas of dehydrated potato products under specific conditions. The aromas are purged from the RAS with helium and trapped with a polymeric adsorbent trap. The trapped aromas are then thermally desorbed onto a gas chromatograph that is modified to accommodate large volume injections (ref. 2) and equipped with a mass selective detector. The level of each aroma compound is expressed as a peak area for a selected ion (m/e) at the retention time of the aroma compound. In this way, the relative levels of each aroma compound in different samples can be compared using ratios of the peak areas for the selected ion at the retention time of the aroma compound.

Materials

Chemicals are of analytical grade and gases are of high purity. The synthetic saliva is chosen to contain the buffering system of simulated saliva (ref. 4): 20 mM NaHCO$_3$, 2.75 mM K$_2$HPO$_4$, 12.2 mM KH$_2$PO$_4$, and 15 mM NaCl with a pH of 7.0.

Apparatus

1. A retronasal aroma simulator (RAS), similar to one described in ref. 1, consists of a 1-liter stainless steel Waring blender with a screw-top lid and a copper coiled waterjacket to control the temperature in the RAS to 37° C. The RAS is connected to a variable autotransformer.
2. A trap (ref. 2 and 3) consists of a 1-ml syringe barrel with a threaded glass tip packed with deactivated glass wool and Tenax GR (60/80 mesh, 250 mg).
3. Gas Chromatograph (GC): Hewlett Packard (HP) model 6890: the GC is modified to accommodate the injection of an adsorbent trap and cryo-focus of the thermally desorbed aromas.
4. GC column: Durabond-5® Mass Spectrometer (30 meters in length, 252 mm column ID and 1.0 mm film thickness) obtained from J&W Scientific of Folsom, Calif., USA.
5. Carrier gas, helium, 2 ml/min. flow rate;
6. The Detector is a model HP 5973 Mass Selective Detector obtained from Hewlett Packard, Santa Clarita, Calif., USA having a source temperature of about 230° C., and a MS Quad temperature of about 150° C.

Analytical Procedure

1. Thermostat RAS to 37.0° C.
2. Add 150 mls of artificial saliva solution to the dry RAS. 200 µls of an internal standard solution (2-heptanone, 500 ppm in water) is added to the RAS.
3. Connect purging helium line to RAS with valve off. Purging flow is set to about 54 ml/min.
4. Weigh 20.0 g rams of sample and add sample to RAS.
5. Close the lid of RAS. Connect the trap (preconditioned) to the RAS.
6. Turn purging helium on and start the RAS (voltage setting 60 Volts on variable autotransformer) and start timer.
7. Turn blender off after 30 seconds, but collect for a total of 5 minutes.
8. After collection, back purge the trap with dry helium at a flow of about 43 ml/min for 30 minutes.
9. Start sequence of sample loading and analysis. In this step, the precolumn is cooled to about −90° C., then the trap is connected to a helium flow (flow rate about 15 ml/min) and is heated to desorb the trapped aroma compounds. After the loading is finished, the GC-MS analysis is as follows. The following temperature program is used.
    i) an initial temperature of about 50° C. which is held for 1 minute, ii) increase the initial temperature at a rate of about 4° C./min until a temperature of about 250° C. is reached,
iii) hold at about 250° C. for 1 minute.
10. Flavor compounds are identified using the MS spectral libraries of John Wiley & Sons and the National Institute of Standards and Technology (NIST), purchased and licensed through Hewlett Packard.
11. Chromatographic peaks are integrated using the Chemstation software obtained from Hewlett Packard, Santa Clarita, Calif., USA.

FIRMNESS (CONSISTENCY) OF POTATO MASH BY BACK EXTRUSION METHOD

Adherence of the potato mash to a drum dryer and applicator rolls depends in large part upon required product consistency. A mash consistency that is too thin may indicate overcooking and high moisture content and will not adhere to the rolls. Similarly, a mash consistency that is too thick may indicate under cooking and may contain pieces of uncooked potato which will impede mash adherence to the drum and rollers. The mash consistence can be assessed by a back extrusion test which will give an indication of product physical attributes and viscosity.

Apparatus

TA-XT2 Texture Analyzer, (TA Instruments, Corp., New Castle, Del.) with A/BE Back Extrusion Cell consisting of a locating base plate, sample containers (50 mm internal diameter), three compression discs (35, 40, 45 mm diameter), and a heavy duty probe adapter. The 35mm and 45 mm discs are used to measure potato mash firmness. A 5 kg load cell is utilized to calibrate the instrument. The instrument is calibrated according to instrument manual instructions (See STABLE MICRO SYSTEMS LTD Guide, Version 1.00).

The back extrusion rig consists of a perspex base plate which is used to centrally locate the sample container beneath a disc plunger. The sample is deposited into the sample container and a compression test extrudes the product up and around the edge of the disc and relates to measurements of viscosity. Three disc diameters are provided to allow flexibility of products to test. Selection depends primarily on the type of product to be tested and whether it contains any particulate.

| TA-XT2 Settings: | |
|---|---|
| Mode: | Measure Force in Compression |
| Option: | Return to Start |
| Pre-Test Speed: | 4.0 mm/s |
| Test Speed: | 1.0 mm/s |
| Post-Test Speed: | 1.0 mm/s |
| Distance: | 35 mm* |
| Trigger Type: | Auto - 10 g |
| Data Acquisition Rate: | 250 pps |

Test Set-up:

The tests were carried out in a standard size back extrusion container (50 mm diameter) immediately after removal from the process sampling point. Temperatures of the sample remained constant. The extrusion disc was positioned centrally over the sample container.

For comparison of stickiness and "work of adhesion", the probe must return to the same position above the samples after each test. To do this it is necessary to calibrate the probe to a distance which is a starting distance of e.g. 30 mm, above the top of the pot or the sample surface.

For the purpose of comparison the test temperature and container geometry should be the same (and should always be specified) when reporting results.

Note: The distance of extrusion to be set in the TA Seitings will depend upon the depth of the sample within the container, the depth of the container, and whether the chosen container is tapered towards the base or not. The chosen depth should be such that the extrusion disc does not come into contact (or indeed approach very close) to either the walls or base of the container during testing which could produce an erroneous result.

When a 10 g surface trigger is attained (i.e. the point at which the disc lower surface is in full contact with the product) the disc proceeds to penetrate to a depth of 25 mm (*or other specified distance). At this point (most likely to be the maximum force), the probe returns to its original position. The 'peak' or maximum force is taken as a measurement of firmness—the higher the value the more firm is the sample. The area of the curve up to this point is taken as a measurement of consistency—the higher the value the thicker the consistency of the sample.

The negative region of the graph, produced on probe return, is as a result of the weight of sample which is lifted primarily on the upper surface of the disc on return, i.e. due to back extrusion and hence gives again an indication of consistency/resistance to flow off the disc. The maximum force is taken as an indication of the stickiness (or may in this case be referred to as cohesiveness) of the sample—the more negative the value the more 'sticky' or 'cohesive' is the sample. The area of the negative region of the curve is often referred to as the 'work of adhesion'—the higher the value the more resistant to withdrawal the sample is which is perhaps an indication again of the cohesiveness and also consistency/viscosity of the sample.

Reference:

STABLE MICRO SYSTEMS LTD Guide Version 1.00

HARDNESS OF POTATOES (Texture Profile Analysis—TPA)

This method measures the force required to penetrate a 1 cm×1 cm×1 cm piece of potato until it reaches the center. This force correlates with the degree of cook of the potato pieces. Raw potatoes are tougher and therefore the force require to reach the center of the potato piece is larger.

Apparatus

TA-XT2 Texture Analyzer with P/2N 2 mm Needle Proble using a 5 kg load cell was utilized.

| TA-XT2 Settings: | |
|---|---|
| Option: | TPA |
| Pre-Test Speed: | 1.0 mm/s |
| Test Speed: | 1.0 mm/s |
| Post-Test Speed: | 1.0 mm/s |
| Distance: | 30% strain |
| Trigger Type: | Auto - 5 g |
| Time: | 3 sec |
| Data Acquisition Rate: | 200 pps |

Sample Preparation

1 $cm^3$ samples are prepared from potatoes cooked for various times, including 0 minutes (i.e. raw). A minimum of 5 samples are taken from each cook time to reduce variation.

Test Conditions and Set-up

Immediately after cooking and cutting, each cube is placed on a heavy duty platform, positioned centrally under the 2 mm needle probe (attached to the load cell carrier) and the penetration test commenced. The top surface of the cube should be flat and level with the platform (i.e. no slant). Before each test, the probe should be carefully wiped clean to remove all adhering debris.

PERCENT OF BROKEN CELLS TEST

The percent of broken cells in the potato flakes and the average size of the cells is determined by simple observation through the light microscope. A small amount of flakes is spread on a portaglass, and 2–3 drops of water are added immediately. After 30 sec., the sample is ready to be observed through the light microscope (100×). The % broken cells are determined by counting the number of cells directly from a picture. Percent of broken cells=# broken cells/# cells in the picture. This method is used for characterizing the physical properties of potato cells in potato flakes. Transmitted Light Microscopy is used to qualitatively monitor the cell size, degree of cell separation and estimate the level of broken cells in potato flakes.

Apparatus

| | |
|---|---|
| Microscope | Transmitted Light with photographing and at least 80× capabilities (Bausch & Lomb Balplan, Zeiss Universal) |
| Microscope slides | Standard variety; 1" × 3" (found in VWR catalog) |
| Cover Slips | Corning #1, 22 mm sq (found in VWR catalog) |
| Spatula | Micro size (found in VWR catalog) |
| Dropping bottle Pipet | Pyrex Brand Stopper Dropping bottle with Bulb and |

Reagents

| | |
|---|---|
| Water | Deionized Distilled |

As a guideline for evaluation of the pictures, the following figures are shown: es that are processed without the leaching and cooling step.

1) broken cells—Cells not having distinct intact cell walls. A sample with <50% broken cells is shown in FIG. 4A.
2) size of cells—similar to Reference (smaller than Reference OK; average of about 40 um after hydration)
3) uniform size of cells—cells with similar degree of swelling (cells not swollen but intact)
4) degree of cell separation—not bundled (like grapes)

Sample Preparation

Representative samples should be taken. A known reference flakes should be observed for comparison with each set of potato flakes. Three samples from each flake lot and reference flake should be used to make observations.

Sample Preparation Instructions

1) Place a small amount (~0.002 g.) of dry flakes on a microscope slide.
2) Add two drops (~100 μL) deionized distilled water to flakes and and evenly disperse the flakes in a thin layer (ideally 1 cell layer thick). Allow flakes to hydrate. Note: Do not to touch the flakes with dropper. Touching the flakes with dropper can contaminate the water.
3) Lower coverslip gently over flakes, to work out the large air bubbles which have a tendency to become entrapped.
4) Hydration for flakes is 1–5 minutes. The flakes should not be photographed after 10 minutes. After 10 minutes, samples absorb the water added. Do not rehydrate. Prepare a new slide.
5) Scan quickly over entire slide and make visual observations. Photograph/Image representative areas of potato cells within 1–5 minutes of hydrating. Compare to reference flakes run the same day.
6) All photos/images should be taken at the same magnification for comparison. The recommended magnification is 40–100×.

SHEET STRENGTH TEST

The sheet strength is determined as follows: Sheet strength is the measurement of the force needed to break a dough sheet of 0.635 mm. The sheet strength is read as the maximum peak force (gf) of a graph obtained from force against distance. The test is designed to measure potato dough sheet strength. All products are tested at room temperature. Sheet strength is an average of ten repetitions of each test. The sheet strength is measured by preparing a dough comprising:

a) 200 g of solids;
b) 90 g of water; and
c) 0.5 g of distilled mono and diglyceride of partially hydrogenated soybean oil emulsifier available from Quest.

The dough is made in a small Cuisinart® mixer at low speed for 10–20 seconds. After mixing the dough is sheeted using a conventional milling machine to a thickness of 0.635 mm (22 mils). The mill rolls are usually 1.2 meter length× 0.75 meter diameter.

This test is conducted using a Texture Analyzer (TA-XT2) from Texture Technologies Corp., New Castle, Del. This equipment uses a software called XTRAD. This test utilizes a 7/16" diameter acrylic cylinder probe (TA-108), which has a smooth edge to minimize any cutting of the dough sheet. The dough sheet is held between two aluminum plates (10×10 cm). The aluminum plates have a 7 cm diameter opening in the center. Through this opening the probe makes contact with the sheet and pushes it downwards until it breaks. These plates have an opening in each corner to hold the sheet dough in place. Each dough sheet is pre-punched with holes to fit over the alignment pins at the corners of the plate and cut to the size (10×10 cm) of the plate. This provides uniform tension as the probe moves down and through the sheet. The probe travels at 2 mm/second until the dough sheet surface is detected at 20 g rams of force. The probe then travels at 1.0 mm/second for up to 50 mm, a distance chosen to stretch the dough sheet until it thoroughly ruptures. The probe withdraws at 10.0 mm/second. The probe is run in a "Force vs. Compression" mode, which means the probe will move downward measuring the force.

PEAK AND FINAL VISCOSITY MEASUREMENTS USING THE RAPID VISCO ANALYZER (RVA)

The pasting properties of the ingredients are measured using the Rapid Visco Analyzer (RVA) model RVA-4 manufactured by Newport Scientific, Warriedwood, Australia. The method was originally developed to rapidly measure α-amylase activity in sprouted wheat. The RVA is a viscometer that characterizes the starch quality during heating and cooling while stirring the starch sample. The Rapid Visco Analyzer (RVA) is used to directly measure the pasting viscosity of the flakes. The tool requires 2 to 4 g rams of sample and about 25 g ram of water. This is based on a sample having 14% moisture. The amount of water added is adjusted based on the amount of total water present. The amount of water added is based on the following formula:

$$S = \frac{86 \times A}{100 - M}$$

$$W = 25 + (A - S)$$

where

S=corrected sample mass

A=sample weight at 14% moisture basis

M=actual moisture content of the sample (% as is)

W=corrected water mass.

The water and sample mixture is measured while going through a pre-defined profile of mixing, measuring, heating and cooling. This test provides viscosity information that translates into flake quality.

A strong correlation is found with RVA viscosity profile and the properties of the starch. The peak visosity measurement indicates the degree of swelling and gelatinization of potato cells. The final viscosity measurement indicates the degree of cell restructuring.

RVA METHOD

1. Determine moisture on sample from air oven or Ohaus moisture balance.
2. Refer to RVA table to obtain sample weight and H$_2$O weight.
3. Place sample in H$_2$O canister, with paddle turn clockwise and counter-clockwise times each. Jog the paddle up and down 10 times.
4. Place canister into RVA and run the following profile:

| Profile | Time |
| --- | --- |
| idle and hold @ 50° C. | 0–1 min |
| ramp to 95° C. | 1–4.45 min |
| bold at 95° C. | 4.45–7.15 min |
| cool to 50° C. | 7.15–11 min |
| hold at 50° C. | 11–13 min |

VISCO-ELASTIC PROPERTIES (G' AND G")

Samples were blended and sheeted (~0.021 to 0.025 in. thickness) as described in the sheet strength method. A Control Stress Rheometer (Model CSL2-100 from TA Instruments Inc., New Castle Del.) was used to measure G' and G". The dynamic testing was done with a 4 cm cross-hatch parallel plate at 32.2° C. This is an average temperature at which the dough is sheeted out between the rollers.

The test consists of 4 basic steps:
1) Place the sample on the bottom plate and zero gap by lowering the top plate to 80% compression of the original thickness of the dough piece (~0.1 mm). The sample was trimmed so that it has the same size as the upper plate. The exposed edge of the sample was coated with a thin layer of mineral oil to minimize moisture loss during the test.
2) All samples were rested or allowed to equilibrate for 2 min. before measurement to relax any stresses introduced during sample mounting.
3) Stress sweep was performed at low and high frequencies in order to find the linear viscoelastic region for the dough where the sample structure is unperturbed.
4) Frequency sweep was performed at one stress in the linear viscoelastic region to see how the sample structure changes with increasing frequency of oscillation. This gives a representative view of how the elastic and viscous components behave in the sample.
5) The elastic modulus (G'), and loss modulus (G") were recorded at both 1 and 100 rad/sec. In general, the data obtained at 1 rad/sec was used to compare different compositions and process conditions. Rheological results are reported as the average of duplicate measurements.

Decree of Gelatinization (Differential Scanning Calorimeter).

The degree of gelatinization of starch of the potato flakes is measured by using a Differential Scanning Calorimeter model 2920 manufactured by TA Instruments, New Castle, Del.

The percent of degree of gelatinization is defined by the following formula:

$$\% \text{ of } DG = 100\% - \frac{(\Delta H \text{ of starch gelatinization in the flakes (J/g)}) \times (100)}{(\Delta H \text{ of starch gelatinization of raw potatoes (J/g)})}$$

ΔH of starch gelatinization is the area under the curve (ΔH vs Temperature) of the peak found at the gelatinization temperature range of potato starch.

Sample Preparation

Prepare a 10% slurry of potato flakes in water. Transferred 15–25 mg of this slurry into an aluminum hermetic DSC pan. Seal the pan using the special press until the edges are flat. Avoid moisture transfer to the pan by either contact with your hands, or overfilling the pan.

Operation
1. Turn on the purge gas, in this case nitrogen
2. Equilibrate the temperature at 40.00° C.
3. Ramp the temperature from 40.00° C. to 16.00° C. at 10.00° C./min
4. Isotherm the system for 3 minutes at this final temperature
5. Ramp the temperature from 160.00° C. to room temperature.

For the relevant peaks, integrate each to determine the size and area of the peaks The temperature and area of the peaks will determine the thermal event.

The embodiments of the present invention are illustrated by the following examples.

COLOR

Browning of dehydrated products due to raw materials, processing conditions, and storage has been an issue for the dehydration industry. In this application, two methods have been utilized to determine differences in color due to processing conditions: Hunter Colorimeter and Optical Density Spectrum.

HUNTER COLOR DETERMINATION

Objective: To determine differences in color of the finished chips, to relate to the new flaking processes. The new flakes were made with significant shorter residence time both in the cooker and the drier. As a result of this, the color of the flakes is lighter.

Figure 9:
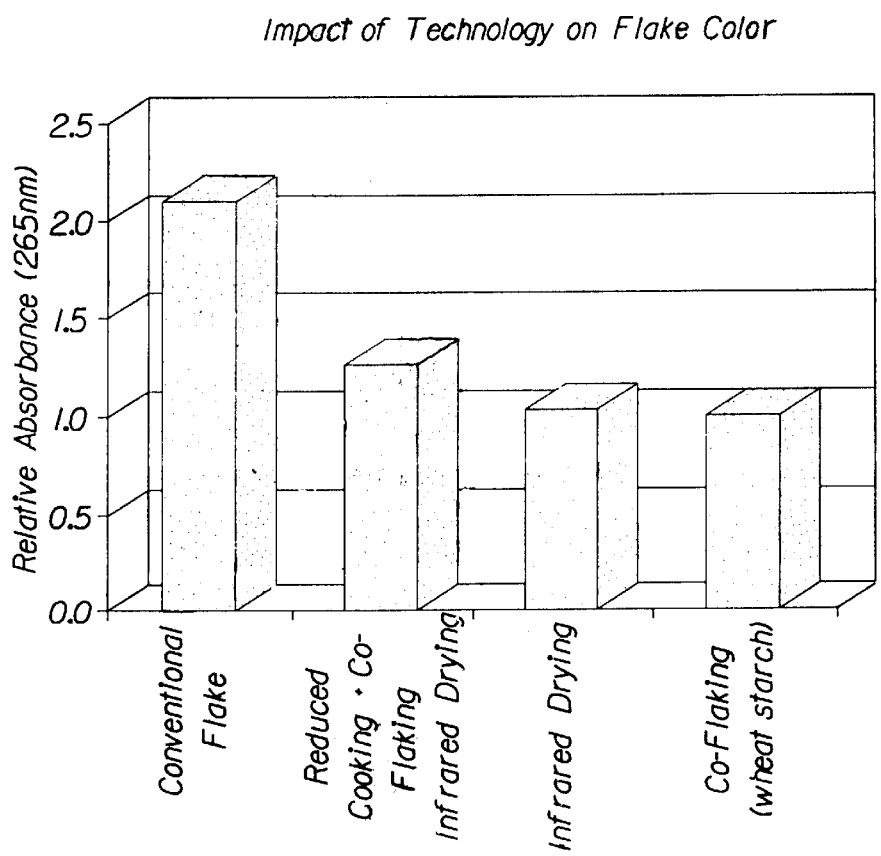
FIG. 9. Graphical illustration of Relative Absorbance Index of potato flakes dispersed in ethanol.

Principle:

This instrument simulates the color perception via human eye. "L", "a", "b", are coordinates in a color plane that indicates the area where the sample is located. The L scale is from black to white, a is from green to red, and b is from blue to yellow, see FIG. 9.

In the case of partial peeled slices or unpeeled whole potatoes, the skin of the potatoes definitely contributes to color.

Equipment: Hunter Colorimeter, Model D25A-PC2, Reston, Va.

Methodology
1. Ensure correct calibration have been performed before utilizing the instrument.
2. Adjust temperature of sample to 70° F.±2° F.
3. Utilize a ground sample of potato flakes 4. Pour sample into clean and dry sample cup to cover black ring and insert a clean, dry white insert in each cup.
5. Place a sample cup over the speciment port; cover the sample cup with the port cover (ensure there are no air bubbles).
6. Press the F3 key. There are two scales and this key will toggle between the two. Use the Hunter L, a, b, scale.
7. Press the F1 key to read the L, a, b values.

BROWNING DETERMINATION-PHOTOMETRICALLY (RELATIVE ABSORBANCE INDEX)

Objective: This method is based on extraction of soluble colored materials from suitably ground samples, followed by clarification of the resultant extracts and photometric evaluation of the extracted color. Differences in absorbance among flakes from this invention and the flakes made with the current potato flaking manufacturing process represent differences in the degree of browning.

Equipment:
  Spectrophotometer Hitachi U-3010, Serial #0838-018
Material:
  Ethyl Alcohol USP absolute-200 proof (AAPER Alcohol and Chemical Co.)
Reference:
  Carl E. Hendel, Glen F. Bailey, and Doris H. Taylor. "Measurement of Non-enzymatic Browning of Dehydrated Vegetables During Storage," *Food Technology*, No. 9 (1950), pp. 344–347.

Methodology
  This method is a based on the method developed by Hendel, 1954. This method consist of 3 steps: 1) extraction of soluble colored materials from suitably ground samples, 2) clarification of the resultant extracts, and 3) photometric evaluation of the extracted color.

Extraction: Ethanol is used as the extraction medium for dehydrated potatoes. Grind the sample to pass through a screen with openings of about 2 mm. Weigh 2 gram (d.b.) sample into a 100 mL volumetric flask. The solution is stirred vigorously for approximately 30 min.

Clarification: The solution is then placed into a 3 cc syringe and put through a syringe filter into a quartz cuvette. The filtered solution is then measured against an ethanol blank for absorbance.

Photometric evaluation: The absorbance is taken over the range 220 nm to 600 nm. The absorbance for this extraction of color is taken at 265 nm. This wavelength is chosen because this is approximately in the middle of the protein portion of the spectrum in the range where tryptophan and tyrosine are expected to be evident.

EXAMPLES

The following examples are illustrative of the present invention but are not meant to be limiting thereof.

Example 1

Raw Russet Burbank potatoes having a solids level of 21% and a specific gravity of 1.072 are washed in room temperature water (~90 kg water to ~45 kg potatoes) to remove dirt and any foreign materials, steam peeled at 5.6–6.0 kg/cm$^2$ pressure for 23 seconds (50% full peeling time) at 11.25–12.0 sec/rev rotation speed, scrubbed with a Hobart® Abrasive Peeler with ribbed rubber surface for 30 seconds and cut into ¼" thick slices using Lan Elec® slicer. The potato slices are then subjected to a cooking step. The cooking is conducted using Ball Canning Table and Reimers Electric steam boiler with 207° F. steam for 15 minutes at a pressure of 20 psig. The potato slices are then shredded using Hobart® meat grinder with ⅜" opening die plate and mashed using Hobart® mixer with paddle for 1 minute to produce a potato mash. Ten grams of monoglyceride (Diamodan PVK, Danisco Co.), previously dispersed in water is added to the mash and mixed for one minute in the Hobart® mixer. One hundred seventy nine grams (10% dry basis) wheat starch (ADM, Milling Company, Milwakee, Wis.) is added to the mash and mixed for an additional 2 minutes in the Hobart® mixer. The mash is applied to the four applicator rolls of an Overton® single drum dryer. The drum is maintained at 78–80 psi steam pressure (a temperature of 322–324° F.) and is rotated at a speed of about 9 sec/rev (6.67 rpm). The drum has a diameter of 12 inches and is 20 inches long. Infrared heat is applied to the outer surface of the drum using a infrared radiant heater, Model 1010, manufactured by RAYMAX, St. Louis, Mo. The heaters are 22 inches long and 4 inches wide. The heaters supply 10 W/in$^2$ power which provided a temperature up to 1000° F. (537.7° C.). The heaters are controlled with Watlow Series 988 process controllers, manufactured by Watlow, St. Louis Mo. The infrared heater is placed 2 inches from the surface of the drum. A thin sheet layer of 0.005 inches is formed on the drying drum. The sheet having a moisture content of 8.8% is removed from the drum by a doctor knife and milled using a Comitrol® grinder to a to a particle of 30% maximum through a 40 US mesh. The resulting flakes comprise about 22.1% amylose, about 2.7 mg/100 g Vitamin C, a WAI of about 8.83 and a peak RVA of 143.42 RVA units.

Example 2

Whole, raw Russet Burbank potatoes having a solids level of 21% are washed with room temperature water to remove dirt and any foreign materials. The potatoes are then boiled in water for 25 minutes. The potatoes are then shredded using Hobart® meat grinder with ⅜" opening die plate and mashed using Hobart® mixer with paddle for 1 minute to produce a potato mash. Ten grams of monoglyceride (Dimodan PVK, Danisco Co.), previously dispersed in water is added to the mash and mixed for one minute in the Hobart® mixer. The mash is applied to the four applicator rolls of an Overton® single drum dryer. The drum is maintained at 85 psi steam pressure (a temperature of 328° F.) and is rotated at a speed of about 20 sec/rev (3.0 rpm). The drum has a diameter of 12 inches and is 20 inches long. Infrared heat is applied to the outer surface of the drum using a infrared radiant heater, Model 1010, manufactured by RAYMAX, St. Louis, Mo. The heaters are 22 inches long and 4 inches wide. The heaters supply 10 W/in$^2$ power which provided a temperature up to 1000° F. (537.7° C.). The heaters are controlled with Watlow Series 988 process controllers, manufactured by Watlow, St. Louis Mo. The infrared heater is placed 2 inches from the surface of the drum. A thin sheet layer of 0.007 inches is formed on the drying drum. The sheet having a moisture content of 12.9% is removed from the drum by a doctor knife and milled using a Comitrol® grinder to a to a particle of 30% maximum through a 40 US mesh. The resulting flakes comprise about 19.4% amylose, about 8.1 mg/100 g Vitamin C, a WAI of about 7.94 and a peak RVA of 92.83 RVA units.

Example 3

A 50:50 mixture of whole raw Russet Burbank potatoes and Bintje potatoes having a solids level of 20.5% are washed, rinsed and brushed with water. The whole potatoes are cooked with steam (20 psi) for about 22 minutes. The potatoes are then mashed to produce a potato mash. Wheat starch is added to the potato mash at a 6.3% level (dry basis) after the cooker and mixed during the conveying of the mash to the drum dryer. The mash comprising the starch is applied to the top of three drying drums (#4, #5 and #6). No infrared heaters are employed. The drums pressures, temperatures and speed are listed in the table below. The drums have a diameter of 5 feet and a length of 16 feet. A thin layer of mash is formed on the drying drums. The sheet having a moisture content of 5.98% is removed from the drum by a doctor knife, combined at a flaker for sorting and milling to a particle size of 30% maximum through a 40 US mesh. The resulting co-flaked product comprise about 26.9% amylose, about 12.3 mg/100 g Vitamin C, a WAI of about 9.35 and a peak RVA of 273.3 RVA units.

| Drum | Steam Pressure | Drum Temperature | Drum Speed | Sheet Thickness |
|---|---|---|---|---|
| #4 | 8.5 bar | 352° F. | 17.0 s/rev | 0.013 μm |
| #5 | 6.0 bar | 329° F. | 18.0 s/rev | 0.0145 μm |
| #6 | 8.1 bar | 349° F. | 18.5 s/rev | 0.013 μm |

Example 4

Russet Burbank potatoes with an average of 21% solids and an average of 1.5% reducing sugars are washed, rinsed and brushed with water. Potatoes are lightly peeled, sliced to 14.3 mm (9/16") thickness, and then cooked. Potato flakes are manufactured following three different sets of process conditions.

(1) Baseline flakes refers to flakes made under control conditions; (2) WS flakes refers to potato flakes containing wheat starch; and (3) WS+IR flakes refers to potato flakes containing wheat starch and dried with a combination of drum drier and infrared heating.

The pre-treatment of the potatoes is the same in all cases (baseline, WS and WS+IR) except for a slightly shorter peeling time for the WS and WS+IR flakes. A significant difference is made in the cooking procedures, where the cook time is lowered from 35 min (baseline) to 27 min (WS and WS+IR). The emulsifier solution addition rate is 142 L/h for all runs. The concentration of the emulsifier in the solution is approximately 5.2%. This effectively means an addition rate of 0.49% in the final product (flakes). The citric acid addition rate is 60 ppm based on the final product—flakes. The main purpose for adding citric acid is the extension of the shelf life of the finished product possibly by complexing metal ions that naturally exist in potato flakes. During the tests, the amount of water added to the mash decreases from a typical value of 250 kg/h (550 lb/h) for 4 drums to 0 kg/h. For potato flakes containing wheat starch (available from ADM Co.), wheat starch is dosed into the mash at a rate of 5.0% of the finished product—flakes.

TA (texture analysis) back extrusion method is used to measure mash firmness, and a the average firmness [gforce] for the 27 min cook time is 3012, while the average firmness [gforce] for the 35 min cook time is 2606. All the measurements are based on a 35 mm diameter probe. Therefore there is a 14% increase in mash firmness when the cook time is reduced from 35 min to 27 min. Hard pieces in the mash increase in number from 8.5 pieces/2000 g of mash for regular cooking (35 min cooking time) to 34 pieces/2000 g of mash for reduced cooking (27 min cooking time). It is important to limit the size of uncooked pieces to 6 mm (¼") because that is the gap between the drum and the rolls. If the hard pieces are larger, they will sit on the roll and block the deposition of the mash onto the drum until they cook sufficiently and disintegrate to pieces smaller than 6 mm (¼").

Four drum dryers (#1, #2, #3, #4) with a diameter of 5 feet and a length of 16 feet are used to manufacture flakes of this invention. The infrared panels are located only around one drum dryer (#2).

| Unit Operation | Condition |
|---|---|
| Peeler | Pressure = 11.5 bar (168 psi) |
| | Peeling time = 8 s |
| | Peeling losses = 3.4% |
| Slicer | Slices = 14.3 mm (9/16"). |
| Cooker | Steam Flowrate = 2049 kg/h (4523 lb/h) |
| | Residence time = 35 min - Baseline |
| | Residence time = 27 min - WS and WS + IR |
| | Water addition: started at 250 L/h for 4 drums and ended at 0 L/h |
| | Emulsifier addition = 0.49% of flakes |
| | Citric acid addition = 60 ppm of flakes |
| Wheat Starch Addition Drum | Addition = 5% of flakes |
| | Steam flow = 1600 kg/h (3532 lb/h) |
| | RPM = 4.75 (drums #1,3,4) |
| | RPM = 5.4 (drum #2 - IR panels) |

The electrical control system incorporates a dual control strategy for the IR panels. They can be controlled either by measuring the panel temperature or by adjusting the panel power consumption. Both systems are implemented in order to prevent the failure of panels due to thermocouple burnout.

| | Electrical control system for IR panels | |
|---|---|---|
| System Information | Control Software | Data Acquisition and Control Boards |
| Name | Cimplicity HMI | — |
| Product ID | IC646TDV300 | IC646NMR000 |
| Description | 300 I/O development system | MODBUS RTU |
| Serial number | 6994030881 | 6996180940 |

The maximum power consumption of IR panels (all heaters at 100%) is 126.72 kW. The observed power consumption oscillates ±5 kW around the setpoint. See FIG. 12A. The maximum temperature that can be reached with the present system (power density=23.3 kW/m$^2$ (15 W/in$^2$)) is 494° C. (920° F).

FIG. 12B shows the distribution of IR panels and power as it is set up in the lowest point of the drum drier. There are 5 banks of IR heaters (A, B, C, D, and E) located on the lowest point of the drum, and following the last mash deposition roll. The panels and conduits are cooled with forced convection to prevent the overheating of the electrical wiring system.

Flake quality data obtained during the test presented in Example 4

| Condition | WAI [g/g] | Amylose [%] | Reducing Sugars [%] | Density [g/cm³] | Moisture [%] | PDS on Mesh [%] 20 | 40 | 100 |
|---|---|---|---|---|---|---|---|---|
| Baseline | 9.6 | 23.3 | 1.1 | 0.55 | 7.0 | 2.1 | 24.6 | 54.1 |
| WS | 9.0 | 24.9 | 1.5 | 0.56 | 7.0 | 2.0 | 22.8 | 54.3 |
| IR + WS | 8.3 | 25 | 1.5 | 0.50 | 7.7 | 0.9 | 27.4 | 57.3 |

The quality data above shows that as the work input into flakes is decreased, the WAI decreases. There is a significant drop from baseline to WS flakes; this can be attributed to the decrease in cooking time (from 35 min to 27 min). The decrease in WAI from WS to WS+IR flakes is attributed to the shorter residence time of the flakes on the drum (decreased by 14%). In all cases the level of amylose is similar. Reduced cooking decreases the level of amylose by decreasing cell damage and subsequent leaching of cell contents, but the addition of wheat starch makes up for the reduction.

Process conditions for the three tests discussed in Example 4

| Condition | Cook time [min] | WS addition [%] | IR Average Temp [° C./(F.)] | IR Average Power [kWh] |
|---|---|---|---|---|
| Baseline | 35 | 0 | (No IR) | (No IR) |
| WS | 27 | 5.0 | (No IR) | (No IR) |
| WS + IR | 27 | 5.0 | 454/(850) | 100 |

The data in the above table shows the average process conditions during the three runs. The cook time is decreased from 35 min to 27 min. The average IR panel temperature is 454° C. (850F) for testing. The average power consumption of the system is 100 kW (corresponds to the evaporation of 160 kg water/h). The average steam flow is the highest on drum #2 (with infrared panels located in the under the drum dryer). Drum RPM shows clearly a difference between drum #2 (IR) and the other three drums. Drums 1, 3, and 4 have the same average RPM throughout the test with a very similar standard deviation. It can be seen that the difference between the Drum #2 RPM is statistically significant when compared to the values of Drums 1, 3, and 4.

The table below shows the key process parameters for the different drum dryers. Drum #2 is the only one with infrared panels.

Comparison of process conditions for drums 1–4

| Drum (Line C) | Steam Flow [kg/h] | Drum Rotation [RPM] | Flake Moisture** [%] | Sheet Temperature [° C. (F.)] |
|---|---|---|---|---|
| #1 | 1643 ± 122 | 4.7 ± 0.6 | 8.4 ± 0.7 | 108 ± 5 (226 ± 9) |
| #2 | 1698 ± 260 | 5.4 ± 0.5 | 8.2 ± 0.8 | 107 ± 4 (224 ± 7) |
| #3 | 1528 ± 375 | 4.8 ± 0.7 | 7.4 ± 1.1 | 111 ± 6 (231 ± 11) |
| #4 | 1599 ± 125 | 4.7 ± 0.6 | 7.8 ± 0.6 | 107 ± 4 (224 ± 7) |

The table below provides an overview of all the other measured process variables.

| Process Condition | Avg ± Std |
|---|---|
| Peeler Steam Pressure [bar (psi)] | 11.6 ± 0.2 (170 ± 3) |
| *Peeler Residence Time [s] | 8 ± 0 |
| Precooker Water Temperature [° C. (F.)] | 21 ± 1 (70 ± 2) |
| **Cooker # 5 Steam Flow [kg/h (lb/h)] | 2190 ± 60 (4830 ± 140) |
| Cooker # 5 Steam Pressure [bar (psi)] | 0.3 ± 0.02 (4.4 ± 0.3) |
| **Cooker # 6 Steam Flow [kg/h (lb/h)] | 2050 ± 160 (4525 ± 350) |
| Cooker # 6 Steam Pressure [bar (psi)] | 0.3 ± 0.006 (4.4 ± 0.1) |
| ***Bin # 1 Mash Temperature [° C. (F.)] | 84 ± 3 (183 ± 6) |
| ***Bin # 2 Mash Temperature [° C. (F.)] | 77 ± 3 (170 ± 6) |

The table below illustrates the increase in production rate with the addition of wheat starch to the mash and IR panels to the drum (extra energy source). The combination effect of the two technologies amounts to an increase in the production rate of 17.5% when referenced to the baseline production.

Production rate for the potato flakes of this invention.

| Condition | Production Rate per Drum ± Sdev [kg/h (lb/h)] | Production Rate Increase from Previous Condition [%] | Sheet Thickness [μm (0.001")] | Drum RPM |
|---|---|---|---|---|
| Baseline | 378 ± 20 (834 ± 44) | n/a | 146 ± 17 (5.7 ± 0.6) | 4.2 ± 0.5 |
| WS | 401 ± 17 (885 ± 37) | 6.8 | 141 ± 12 (5.5 ± 0.5) | 4.7 ± 0.6 |
| IR ± WS | 444 ± 27 (980 ± 60) | 10.7 | 144 ± 14 (5.7 ± 0.5) | 5.4 ± 0.5 |

Figure 13A:
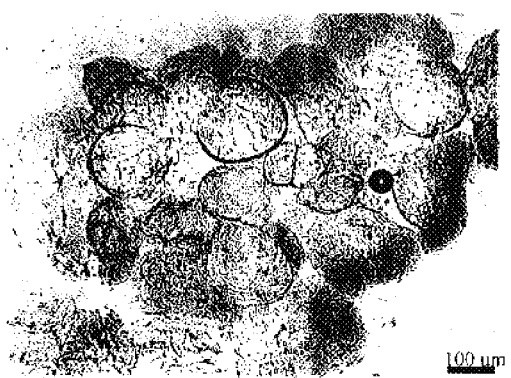
FIGS. 13A, B, and C. Photomicrographs (80×) of potato cells from flakes made using baseline conditions according to Example 4.
Figure 13B:
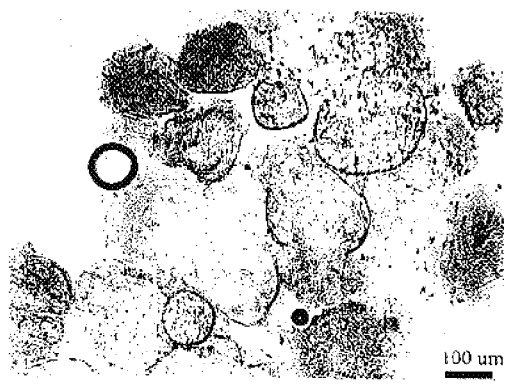
Figure 13C:
Figure 14A:
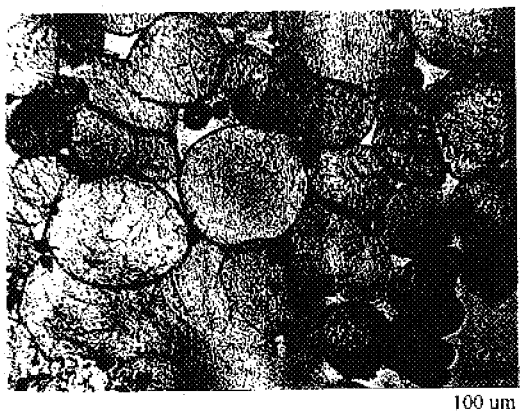
FIGS. 14A, B, and C. Photomicrographs (80×) of potato cells from flakes made using reduced cooking and addition of wheat starch (WS) and dried with drum drying according to Example 4.
Figure 14B:
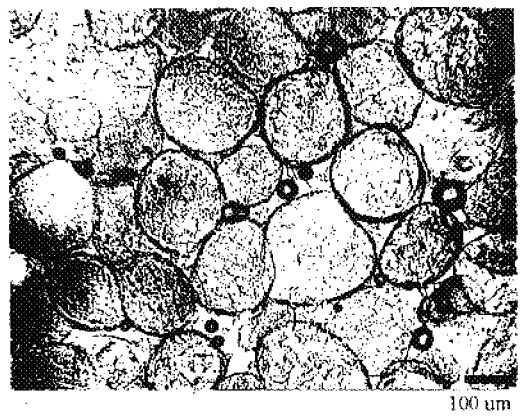
Figure 14C:
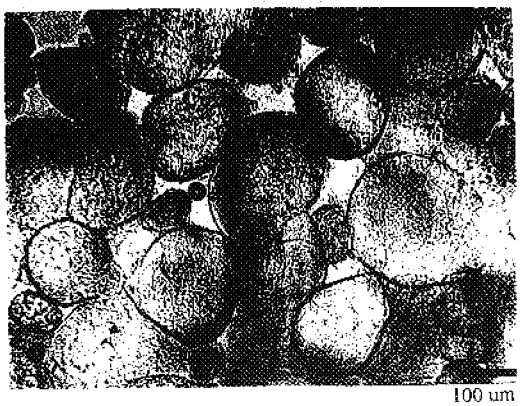

FIGS. 13A, B, and C, and 14A, B, and C, are photomicrographs of potato cells in potato flakes made according to the method described in this example. There is a significant difference in cell breakage, as well as cell expansion, between the potato flakes prepared with conventional methods and those prepared with the method of example 4. The potato flakes prepared with conventional methods show very high levels of broken cells, as well as a large range of cell expansion of intact cells (FIGS. 13A, B, and C). This is an indication of uneven cooking, resulting in some overcooked cells and some under cooked cells. Cell expansion ranges from 100 to 300 um in diameter. The potato flakes prepared with the method of example 4 (FIGS. 14A, B, and C) show a percent of broken cells less than 20%, and the potato cells show even expansion. The range of expansion is from 100 to 250 um in diameter.

INCORPORATION BY REFERENCE

All of the aforementioned patents, publications, and other references are herein incorporated by reference in their entirety.

What is claimed:

1. A method for preparing a dehydrated product comprising:
   (a) providing a starch containing material comprising:
      (1) one or more enzymes capable of causing browning or hydrolysis of cellulosic material; or
      (2) one or more materials capable of causing non-enzymatic browning;
   (b) partially cooking the starch containing material for a predetermined amount of time and temperature sufficient to produce a center texture value of from about 20 gf to about 1000 gf;
   (c) comminuting the partially cooked starch containing material to produce a wet mash; and
   (d) drying the wet mash to produce a dehydrated product having a moisture content below about 15% on a fat free basis.

2. The method of claim 1, wherein step (b) comprises partially cooking the starch containing material for a predetermined amount of time and temperature sufficient to produce a center texture value of from about 100 gf to about 1000 gf.

* * * * *